US012753664B2

(12) United States Patent
Lien et al.

(10) Patent No.: US 12,753,664 B2
(45) Date of Patent: Oct. 6, 2026

(54) METHODS AND SYSTEMS FOR EARTH DRILLING

(71) Applicant: MHWIRTH AS, Kristiansand (NO)

(72) Inventors: Geir Lien, Hoevag (NO); Petter Mydland, Kristiansand S (NO)

(73) Assignee: MHWIRTH AS, Kristiansand (NO)

(*) Notice: Subject to any disclaimer, the term of this patent is extended or adjusted under 35 U.S.C. 154(b) by 0 days.

(21) Appl. No.: 19/032,458

(22) Filed: Jan. 21, 2025

(65) Prior Publication Data

US 2025/0188808 A1 Jun. 12, 2025

Related U.S. Application Data

(63) Continuation of application No. 18/212,723, filed on Jun. 22, 2023, now Pat. No. 12,241,316, which is a (Continued)

(30) Foreign Application Priority Data

Mar. 27, 2019 (GB) ..................................... 1904228
Sep. 13, 2019 (GB) ..................................... 1913257
(Continued)

(51) Int. Cl.
*E21B 17/00* (2006.01)
*B25J 5/00* (2006.01)
(Continued)

(52) U.S. Cl.
CPC ............... *E21B 19/16* (2013.01); *B25J 5/007* (2013.01); *B25J 15/0028* (2013.01);
(Continued)

(58) Field of Classification Search
CPC ...... E21B 19/16; E21B 19/155; E21B 17/006; B25J 5/007; B25J 15/028; B25J 15/0253; F16L 1/06; F16L 57/055
See application file for complete search history.

(56) References Cited

U.S. PATENT DOCUMENTS 2,575,649 A 11/1951 Abegg
2,696,039 A 12/1954 Baker
(Continued)

FOREIGN PATENT DOCUMENTS

CA 1 165 544 A 4/1984
CN 203357446 U 12/2013
(Continued)

*Primary Examiner* — Taras P Bemko
(74) *Attorney, Agent, or Firm* — Norman B. Thot

(57) ABSTRACT

A method of handling a short tubular on a drilling rig. The drilling rig includes a drill floor, a short tubular storage apparatus on which a short tubular is arranged, a vehicle which moves and transports the short tubular storage apparatus on the drill floor, and a tube handling apparatus having a base supported by the drill floor, an arm with a first end pivotally mounted on the base and a second end on which a pick up tool is mounted, and an actuator which pivots the arm relative to the base. The pick up tool holds the short tubular. The method includes using the vehicle to transport the short tubular storage apparatus to a location on the drill floor, and operating the actuator to move the pick up tool to engage the short tubular, to lift the short tubular, and to move the short tubular on the drill floor.

10 Claims, 22 Drawing Sheets

Related U.S. Application Data continuation of application No. 17/442,637, filed as application No. PCT/NO2020/050088 on Mar. 26, 2020, now Pat. No. 11,725,469.

(30) Foreign Application Priority Data

| | | |
|---|---|---|
| Oct. 16, 2019 | (GB) | 1914955 |
| Oct. 23, 2019 | (GB) | 1915306 |
| Dec. 5, 2019 | (GB) | 1917797 |

(51) Int. Cl.

| | |
|---|---|
| ***B25J 15/00*** | (2006.01) |
| ***B25J 15/02*** | (2006.01) |
| ***E21B 19/15*** | (2006.01) |
| ***E21B 19/16*** | (2006.01) |
| ***F16L 1/06*** | (2006.01) |
| ***F16L 57/00*** | (2006.01) |

(52) U.S. Cl.

CPC ......... *B25J 15/0253* (2013.01); *E21B 17/006* (2013.01); *E21B 19/155* (2013.01); *F16L 1/06* (2013.01); *F16L 57/005* (2013.01)

(56) References Cited

U.S. PATENT DOCUMENTS

| | | | | |
|---|---|---|---|---|
| 2,941,283 | A * | 6/1960 | Taylor, Jr. | E21B 17/12<br>29/236 |
| 4,397,605 | A | 8/1983 | Cowgill et al. | |
| 4,442,737 | A | 4/1984 | Miner | |
| 5,318,254 | A | 6/1994 | Shaw et al. | |
| 5,524,672 | A | 6/1996 | Mosing et al. | |
| 5,833,147 | A | 11/1998 | Fuhlbrigge | |
| 6,565,668 | B1 | 5/2003 | Sandberg et al. | |
| 2005/0082857 | A1 | 4/2005 | Latiolais et al. | |
| 2006/0118335 | A1 * | 6/2006 | Belik | E21B 19/08<br>175/161 |
| 2007/0236004 | A1 | 10/2007 | Benedict | |
| 2008/0093091 | A1 | 4/2008 | Mong et al. | |
| 2011/0108265 | A1 * | 5/2011 | Ge | E21B 19/165<br>166/85.1 |
| 2011/0126677 | A1 | 6/2011 | Buchanan | |
| 2012/0097454 | A1 | 4/2012 | Kockeis et al. | |
| 2014/0231076 | A1 | 8/2014 | Brown | |
| 2015/0209940 | A1 | 7/2015 | Kroll | |
| 2019/0003269 | A1 | 1/2019 | Skjærseth et al. | |
| 2020/0040673 | A1 | 2/2020 | Donnally et al. | |
| 2020/0199952 | A1 * | 6/2020 | Helms | E21B 19/16 |
| 2020/0240256 | A1 * | 7/2020 | Grimberg | E21B 44/00 |
| 2021/0355758 | A1 * | 11/2021 | Lien | E21B 19/15 |
| 2022/0163161 | A1 * | 5/2022 | Skjevik | B25J 15/0033 |

FOREIGN PATENT DOCUMENTS

| | | | |
|---|---|---|---|
| GB | 615015 | A | 12/1948 |
| GB | 2 014 102 | A | 8/1979 |
| GB | 2 391 799 | A | 2/2004 |
| GB | 2577290 | A | 3/2020 |

* cited by examiner

METHODS AND SYSTEMS FOR EARTH DRILLING

CROSS REFERENCE TO PRIOR APPLICATIONS

This application is a continuation of application Ser. No. 18/212,723, filed on Jun. 22, 2023, now U.S. Pat. No. 12,241,316, which is a continuation of application Ser. No. 17/442,637, filed on Sep. 24, 2021, now U.S. Pat. No. 11,725,637, which is a U.S. National Phase application under 35 U.S.C. § 371 of International Application No. PCT/NO2020/050088, filed on Mar. 26, 2020 and which claims benefit to Great Britain Patent Application No. GB 1904228.2, filed on Mar. 27, 2019, to Great Britain Patent Application No. GB 1913257.0, filed on Sep. 13, 2019, to Great Britain Patent Application No. GB 1914955.8, filed on Oct. 16, 2019, to Great Britain Patent Application No. GB 1915306.3, filed on Oct. 23, 2019, and to Great Britain Patent Application No. GB 1917797.1, filed on Dec. 5, 2019. The International Application was published in English on Oct. 1, 2020 as WO 2020/197412 A1 under PCT Article 21 (2).

The present invention relates to earth drilling, and particularly to methods and systems for carrying out operations for earth drilling.

BACKGROUND

Drilling rigs have a platform directly under a derrick which provides a work area in which the rig crew can work. The driller's cabin, from which the major components of the rig are controlled, is located adjacent the drill floor.

The drill floor is the most dangerous location on a drilling rig because of the heavy equipment which is moved around the area, yet many tasks associated with the running of a drilling operation are currently carried out manually by personnel working on the drill floor. The most dangerous area of the drill flow is known as the red zone.

In drilling operations, it is common to build a string of tubulars, such as a drill string, on the drill floor above the well center opening. The string is usually assembled using a series of threaded pipe sections, where the threaded connections are made up (or broken out) using appropriate machines, such as pipe handling machines and power tongs. A bottom hole assembly (BHA) including a drill bit, is mounted at the lowermost end of the drill string.

Documents which may be useful to understand the field of technology include U.S. Pat. No. 2,696,039; WO 2014/031969 A1; US 2011/126677; US 2007/236004 A1; U.S. Pat. No. 4,442,737; CA 1165544; U.S. Pat. No. 5,524,672; US 2005/0082857 A1; WO 2016/199103; GB2391799; WO9300261; U.S. Pat. No. 6,565,688; and GB 2014102.

It is desirable to further improve the reliability, operational lifetime and operational efficiency of processes and machines on drilling rigs. At the same time, health and safety requirements remain stringent for such operations, and there is a need for improved solutions which reduce the risk for personnel. The present invention has the objective to provide improved systems and methods in the abovementioned or other areas.

SUMMARY

In an embodiment, the present invention provides a method of handling a short tubular on a drilling rig. The drilling rig includes a drill floor, a short tubular storage apparatus comprising a short tubular arranged thereon, a vehicle which is configured to move around the drill floor and to transport the short tubular storage apparatus around the drill floor, and a tube handling apparatus. The tube handling apparatus comprises a base which is supported by the drill floor, an arm comprising a first end which is pivotally mounted on the base and a second end on which is mounted a pick up tool, and an actuator which is configured to pivot the arm relative to the base. The pick up tool is configured to hold the short tubular. The method includes a step (a) of using the vehicle to transport the short tubular storage apparatus to a predetermined location on the drill floor, and a step (b) of operating the actuator of the tube handling apparatus and the pick up tool to move the pick up tool into an engagement with the short tubular on the short tubular storage apparatus, to lift the short tubular, and to move the short tubular to a desired location on the drill floor.

In a first aspect, there is provided a machine for a drilling plant, the machine having a base, an arm, and a tool carried by the arm, the tool comprising a receiver for a protective cap, the machine being operable to engage the protective cap and remove or install the protective cap from or on an end of a drilling tubular.

The tool may comprise a plurality of engagement elements configured to engage an outer circumference of the protective cap to hold the protective cap fixed.

The engagement elements may comprise: a plurality of flexible members fixed on an inside of a circumferential holder, or a plurality of movable arms operable to engage the outer circumference of the protective cap, preferably wherein the movable arms are controllable.

The receiver may be rotatable and operable to spin in or spin out the protective cap from the end of the drilling tubular.

The receiver may be rotatable by means of a motor arranged on the arm.

In an embodiment, there is provided a drilling plant comprising a machine, wherein the machine is arranged on or adjacent a drill floor and operable to engage the drilling tubular when the drilling tubular is held in a vertical position by a pipe handling machine.

The drilling plant may comprise a storage area for the protective cap, wherein the storage area is spaced from an operating area of the pipe handling machine.

The machine may be arranged: between the operating area of the pipe handling machine and the storage area; between the drill floor and the storage area; and/or between a well center opening and the storage area.

The storage area may comprise a magazine for holding a plurality of protective caps.

The machine may be operable to retrieve a protective cap from the magazine without human intervention and/or place a protective cap in the magazine without human intervention.

The cap may have a first section and the tool may have a second section, the first and second sections being provided with a shape to rotationally interlock the cap and the tool when brought into engagement.

The first and second sections may comprise a protrusion, a depression, a slot or a groove.

In an embodiment, there is provided a method for operating a drilling plant, the method comprising: bringing a tubular into an operating area of a drill floor, the tubular having a protective cap at an end thereof; bringing a tool into engagement with the protective cap, the tool being arranged on a machine having an arm which is movable into the operating area; removing the protective cap from the tubular with the tool; operating the machine to bring the protective cap out of the operating area with the tool.

The step of removing the protective cap may comprise: rotating the tubular while holding the protective cap fixed with the tool, or operating the tool to rotate the protective cap while holding the tubular fixed.

The method may comprise operating the machine to place the protective cap in a storage area.

The step of operating the machine to place the protective cap in a storage area may comprise placing the protective cap in a magazine in the storage area.

In an embodiment, there is provided a method for operating a drilling plant, the method comprising: bringing a tubular out of a well and into an operating area of a drill floor; bringing a tool holding a protective cap into the operating area, the tool being arranged on a machine having an arm which is movable into the drill floor area; placing the protective cap on an end of the tubular with the tool; operating a pipe handling machine to bring the tubular out of the operating area.

The step of placing the protective cap on an end of the tubular with the tool may comprise: rotating the tubular while holding the protective cap fixed with the tool, or operating the tool to rotate the protective cap while holding the tubular fixed.

The method may comprise operating the machine to pick up the protective cap from a storage area.

The step of operating the machine to pick up the protective cap from a storage area may comprise picking the protective cap up from a magazine in the storage area.

According to a second aspect we provide a cleaning apparatus and method for cleaning a drill string.

The apparatus may have a base and an arm, the base being configured to support the arm on a drill floor of a drilling rig, the arm having a first end which is mounted on the base, a second end at which is provided with a spray nozzle and at least one articulated joint by means of which the arm, or a portion of the arm may pivot relative to the base, the apparatus further comprising a fluid flow conduit which is connected to the nozzle so the pressurised fluid entering the fluid flow conduit can spray out of the spray nozzle, and a motor which is operable to pivot the arm about the articulated joint to alter the orientation of the spray nozzle relative to the base.

The articulated joint may form a pivotal connection between the arm and the base.

The arm may comprise a first and second portion which are joined by the articulated joint. In this case, the first end of the arm may also be pivotally mounted on the base.

The spray nozzle may be mounted on a holder which is pivotally connected to the second end of the arm, and the motor operable to pivot the spray nozzle relative to the arm.

The motor may be hydraulically operable.

The cleaning apparatus may further be provided with a controller which is operable to control the operation of the motor, and which is remote from the remainder of the cleaning apparatus.

The base may comprise wheels or tracks which, when the base is resting on a drill floor of a drilling rig are operable to move the base and arm around the drill floor.

The spray nozzle may comprise at least two spray parts each of which extends around a portion of a nozzle axis and is provided with a plurality of fluid exit apertures which are arranged so that fluid ejected from the exit apertures forms jets generally towards the nozzle axis from a plurality of different directions, the two spray parts being spaced from one another in a direction generally parallel to the nozzle axis.

The motor may be operable to pivot the spray nozzle between a first position and a second position, the nozzle axis rotating through approximately 90° during pivoting of the spray nozzle between the first position and second position.

A method of washing a drilling string comprising a plurality of pipe sections joined end to end may comprise:

a) using an elevator to lift the drill string through an aperture in drill floor,
b) using a cleaning apparatus placed with its base on top of the drill floor to spray cleaning fluid onto the first pipe section as it is lifted including operating a motor of the cleaning apparatus to move the spray nozzle relative to the drill floor in order to direct the cleaning fluid onto a plurality of areas of the pipe section.

The method may further comprise:

c) using the elevator to lift the drill string so that a joint between a first, uppermost, pipe section and a second pipe section directly below the first pipe section is above the drill floor,
d) setting slips so that the uppermost end of the second pipe section is supported by the drill floor,
e) disconnecting the first pipe section from the second pipe section,
f) using the cleaning apparatus placed with its base on top of the drill floor to spray cleaning fluid onto the lowermost end of the first pipe section including operating a motor of the cleaning apparatus to move the spray nozzle relative to the drill floor in order to direct the cleaning fluid onto a plurality of areas of the pipe section.

The method may further comprise:

g) moving the first pipe section from its elevated position above the second pipe section,
h) using the cleaning apparatus placed with its base on top of the drill floor to spray cleaning fluid onto the uppermost end of the second pipe section including operating a motor of the cleaning apparatus to move the spray nozzle relative to the drill floor in order to direct the cleaning fluid onto a plurality of areas of the pipe section.

The method may further comprise:

i) connecting the uppermost end of the second pipe section to the elevator,
j) releasing the slips and using the elevator to lift the second pipe section through the aperture in the drill floor, and
k) using the cleaning apparatus placed with its base on top of the drill floor to spray cleaning fluid onto the second pipe section as it is lifted including operating a motor of the cleaning apparatus to move the spray nozzle relative to the drill floor in order to direct the cleaning fluid onto a plurality of areas of the pipe section.

The second pipe section may comprise a bottom hole assembly having a drill bit.

Any of steps b,f, h and k may comprise pivoting the articulated joint in order to move the spray nozzle relative to the base. Any of steps b,f, h and k may comprise pivoting the articulated joint in order to move the spray nozzle relative to the base around at least a portion of the circumference of the pipe section.

The base of the cleaning apparatus may comprise wheels or tracks which, when the base is resting on a drill floor of a drilling rig are operable to move the base and arm around the drill floor, and any of steps b,f, h and k may comprise operating the wheels or tracks to move the cleaning apparatus around the pipe section in order to spray cleaning fluid into a plurality of sides of the pipe section.

Any one of steps b, f, h, or k may comprise operating the motor of the cleaning apparatus to move the spray nozzle in a reciprocating manner in a direction generally parallel to a longitudinal axis of the drill string.

Where the motor is operable to pivot the spray nozzle between a first position and a second position, the nozzle axis rotating through approximately 90° during pivoting of the spray nozzle between the first position and second position, any one of steps b, f, h or k may comprise operating the motor to pivot the spray nozzle to an engage/release position in which the nozzle axis is generally perpendicular to the longitudinal axis of the drill string, operating the arm motor to move the spray nozzle towards the drill string so that the drill string lies between the two spray parts, and then operating the arm motor to pivot the spray nozzle to an operative position in which the nozzle axis is generally parallel to or coincident with the longitudinal axis of the drill string.

We further provide a method of cleaning an elongate part having an longitudinal axis using a cleaning apparatus wherein the motor is operable to pivot the spray nozzle between a first position and a second position, the nozzle axis rotating through approximately 90° during pivoting of the spray nozzle between the first position and second position, the method comprising operating the motor to pivot the spray nozzle to an engage/release position in which the nozzle axis is generally perpendicular to the longitudinal axis of the drill string, operating the motor to move the spray nozzle towards the drill string so that the drill string lies between the two spray parts, and then operating the motor to pivot the spray nozzle to an operative position in which the nozzle axis is generally parallel to or coincident with the longitudinal axis of the drill string.

The method may further comprise pumping cleaning fluid into the fluid flow conduit so that cleaning fluid sprays out of the spray nozzle when the spray nozzle is in the operative position.

The method may further comprise the step of operating the motor of the cleaning apparatus to move the spray nozzle in a reciprocating manner in a direction generally parallel to a longitudinal axis of the drill string whilst the spray nozzle is in the operative position and cleaning fluid is being pumped into the fluid flow conduit.

In a third aspect, we provide an apparatus for and method of handling a short tubular such as a sub on a drilling rig which reduces the need for personnel to work in the red zone on the drill floor.

According to the third aspect we provide a method of handling a short tubular on a drilling rig, the drilling rig having a drill floor, a short tubular storage apparatus having a short tubular mounted thereon, a vehicle which is movable around the drill floor operable to transport the short tubular storage apparatus around the drill floor, and a tube handling apparatus comprising a base which is supported by the drill floor, an arm having a first end which is pivotally mounted on the base and a second end on which is mounted a pick up tool, and an actuator which is operable to pivot the arm relative to the base, the pick up tool being operable to hold a short tubular, wherein the method comprises the steps of a) using the vehicle to transport the short tubular storage apparatus to a predetermined location on the drill floor,
b) operating the actuator of the tube handling apparatus and the pick up tool to move the pick up tool into engagement with the short tubular on the short tubular storage apparatus, to lift the short tubular and to move it to a desired location on the drill floor.

The vehicle may have a pick up mechanism, and step a include driving the vehicle to the short tubular storage apparatus, operating the pick up mechanism to engage with the short tubular storage apparatus such that the short tubular storage apparatus is transported across the drill floor with subsequent movement of the vehicle across the drill floor.

Step a may include operating the pick up mechanism to lift the short tubular storage apparatus off the drill floor, driving the vehicle to a desired location and then operating the pick up mechanism to lower the short tubular storage apparatus back onto the drill floor.

The short tubular storage apparatus may comprise a platform, the short tubular being located on top of the platform, and the pick up mechanism may comprise two prongs and a lifting mechanism which is operable to move the prongs generally perpendicular to the drill floor between a lowermost position on or just above the drill floor and an uppermost position, step a comprising operating the lifting mechanism so that the prongs are in the lowermost position, moving the vehicle so that the prongs engage with the platform of the short tubular storage apparatus, operating the lift mechanism so that the short tubular storage apparatus is lifted off the drill floor, moving the vehicle so that the short tubular storage apparatus is above the desired position on the drill floor, and then operating the lifting mechanism to lower the short tubular storage apparatus into the desired position on the drill floor.

The drill floor may be provided with a marker which marks the desired position of the short tubular storage apparatus on the drill floor, and step a includes using the vehicle to transport the short tubular storage apparatus to the position on the drill floor indicated by the marker.

The tube handling apparatus may further comprise a motor which is connected to the actuator and operable to drive the actuator, and step b comprises operating the motor.

The tube handling apparatus may be provided with a controller which is operable to control the operation of the actuator, and step b includes using the controller to control operation of the tube handling apparatus at a location which is remote from the remainder of the guiding apparatus.

The articulated joint may form a pivotal connection between the arm and the base, and step b includes using the actuator to pivot the arm about the pivotal connection between the arm and the base.

The arm may comprise a first and second portion which are joined by the articulated joint, and step b of the method comprise using the actuator to pivot the arm about the articulated joint.

The first end of the arm may also be pivotally mounted on the base, and step b comprise using the actuator to pivot the arm about the articulated joint and the pivotal connection to the base.

We further provide a short tubular storage apparatus comprising a platform with at least one tubular support formation is provided on its uppermost surface, the tubular support formation being configured to engage with and restrict the movement of an end of a short tubular, wherein the apparatus further comprises a support frame which extends upwardly from the uppermost surface of the platform, and which has a cradle which is held above the uppermost surface of the platform and which is configured to engage and support with upper or intermediate portions of a short tubular whose lowermost end is engaged with the tubular support formation.

The tubular support formation may comprise a rod which extends upwardly from and generally perpendicular to the uppermost surface of the platform.

The cradle may be arranged such that when the platform is on a horizontal surface, the cradle is vertically above the tubular support formation.

A row of tubular support formations and a row of cradles may be provided, the cradles being arranged such that when the platform is on a generally horizontal surface, each cradle is vertically above one of the tubular support formations.

In a fourth aspect, there is provided an apparatus for and method of setting slips around a drill string, particularly but not exclusively, on a drilling rig.

According to the fourth aspect we provide an apparatus for setting slips around a drill string comprising a base and an arm, the base being configured to support the arm on a drill floor of a drilling rig, the arm having a first end which is mounted on the base for pivoting about a first axis which, when the base is supporting the arm on the drill floor, is generally perpendicular to the drill floor, a second end at which is provided with a slip lifting tool, the arm comprising a first portion and a second portion which are connected by a joint by means of which the second portion may rotate with respect to the first portion about a second axis which is generally perpendicular to the first axis, the first portion extending from the first end of the arm to the joint, and the second portion extending from the joint to the second end of the arm.

The apparatus may further comprise a first actuator which is operable to pivot the arm relative to the base about the first axis.

The apparatus may further comprise a second actuator which is operably to pivot the second portion of the arm relative to the first portion of the arm about the second axis.

The slip lifting tool may comprise a spring which can be connected to slips mounted on the slip lifting tool to urge the slips to an open position.

The slip lifting tool may comprise a gripper having first and second clamp parts and a gripper actuator which is operable to move the first and second clamp parts towards one another to a grip position, and away from one another to a release position. The slip lifting tool may further comprise a separate slip holder which has a connector by means of which the slip holder can be mounted on the slips and a grip part which is shaped to be gripped by the gripper by placing the first and second clamp parts around the grip part and using the actuator to move the clamp parts to the grip position. The connector may comprise an elongate support beam which has a longitudinal axis, a first end to which the grip part is connected, and a second end provided with a plurality of prongs which extend generally downwardly perpendicular to the longitudinal axis of the support beam The slip holder may comprise at least one spring a first end of which is connected to the slip holder and a second end of which is adapted to be connected to the slips on which the slip holder is mounted.

The slip lifting tool may be pivotally mounted on the second end of the arm for rotation with respect to the arm about a third axis which is generally perpendicular to the longitudinal axis of the second portion of the arm. The slip lifting tool may be pivotally mounted on the second end of the arm for rotation with respect to the arm about a fourth axis which is generally perpendicular to the longitudinal axis of the second portion of the arm and to the third axis.

The apparatus may further comprise a third actuator which is operable to pivot the slip lifting device relative to the arm about the third axis.

The apparatus may further comprise a fourth actuator which is operable to pivot the slip lifting device relative to the arm about the fourth axis.

The or each actuator may be hydraulically or pneumatically driven.

According to the fourth aspect, we further provide a drilling rig having a drill floor with a well centre aperture and slip lifting apparatus, the base of the slip lifting apparatus being mounted on the drill floor at a location spaced from the well centre aperture.

According to the fourth aspect we provide a method of mounting slips around a drill string extending through the well centre aperture on a drilling rig, the method comprising:

a) with the second end of the arm of the slip lifting apparatus positioned at a location which is spaced from the well centre aperture, first mounting slips on the slip lifting tool, b) then pivoting the arm of the slip lifting apparatus about the first axis to move the slips around the drill string, and c) then pivoting the second portion of the arm of the slip lifting apparatus about the second axis to lower the slips down the drill string.

Step b may also comprise pivoting the second portion of the arm of the slip lifting apparatus about the second axis.

The slip lifting tool may comprise a gripper having first and second clamp parts and a gripper actuator which is operable to move the first and second clamp parts towards one another to a grip position, and away from one another to a release position, and a separate slip holder which has a connector by means of which the slip holder can be mounted on the slips and a grip part which is shaped to be gripped by the gripper by placing the first and second clamp parts around the grip part and using the gripper actuator to move the clamp parts to the grip position, step a of the method may comprise the steps of:

a1) positioning the slips at a storage location on the drill floor spaced from the well centre aperture, a2) mounting the slip holder on the slips, a3) then, with the clamps parts of the slip lifting tool in their release position, pivoting the arm of the slip lifting apparatus about the first axis and/or the second portion of the arm of the slip lifting apparatus about the second axis and operating the gripper actuator so that the clamp parts move to the clamp position, and such movement causes the grip part of the slip holder to be gripped by the gripper.

The connector of the slip lifting tool may comprise an elongate support beam which has a longitudinal axis, a first end to which the grip part is connected, and a second end provided with a plurality of prongs which extend generally downwardly perpendicular to the longitudinal axis of the support beam, and step a2 may comprise inserting the prongs into corresponding apertures provided in the slips.

The slip holder may comprise at least one spring a first end of which is connected to the slip holder and a second end of which is adapted to be connected to the slips on which the slip holder is mounted, and step a2 may comprise attaching the second end of the spring to an attachment point on the slips.

The slip lifting tool may be pivotally mounted on the second end of the arm for rotation with respect to the arm about a third axis which is generally perpendicular to a longitudinal axis of the second portion of the arm, and step b of the method may further comprise pivoting the slip lifting tool about the third axis. The slips may have a longitudinal axis which is arranged to be generally parallel to the longitudinal axis of a drill string when the slips are mounted around a drill string, the third axis may be generally parallel to the drill floor, and step b of the method may further comprise pivoting the slip lifting tool in a first direction about the third axis to rotate the slips to bring the longitudinal axis of the slips towards the horizontal prior to positioning the slips around the drill string, and pivoting the slip lifting tool in a second opposite direction about the third axis to rotate the slips so that the longitudinal axis of the slips is generally horizontal whilst positioning the slips around the drill string.

The slip lifting tool may be pivotally mounted on the second end of the arm for rotation with respect to the arm about a fourth axis which is generally perpendicular to the longitudinal axis of the second portion of the arm and to the third axis, and step b of the method may further comprise pivoting the slip lifting tool about the fourth axis.

In one aspect, a tool assembly for handling slips on a drill floor may comprise: an arm comprising a plurality of articulated parts, the arm rotatably mounted on a base which is fixed in relation to the drill floor; a slips lifting tool; a holder or holder means for the slips lifting tool, the holder or holder means arranged on the arm and operable to hold the slips lifting tool; the slips lifting tool comprising a connector operable to engage and carry the slips.

The holder or holder means may be operable to releasably engage and hold the slips lifting tool.

The holder or holder means may comprise a gripper operable to grip and hold a grip part of the slips lifting tool.

The slip lifting apparatus or the arm may be remotely controlled from an operator station.

The slip lifting tool may comprise a slips carrier having a first connector fixed to the slips and a second connector operable to engage the holder.

The second connector may be a grip part operable to be gripped or clamped by the holder or holder means.

The slip lifting apparatus or the tool assembly may be arranged on a movable trolley. The movable trolley may comprise drive units or drive means operable to drive the trolley on or around the drill floor.

In a fifth aspect, we provide an apparatus for and method of moving a suspended object around drill floor of a drilling rig during drilling a well bore or during or oil and/or gas production.

According to the fifth aspect, there is provided a guiding apparatus for moving a suspended object around a drill floor of a drilling rig, the guiding apparatus having a base and an arm, the base being configured to support the arm on a drill floor of a drilling rig, the arm having a first end which is mounted on the base, a second end at which is provided with a wire guide, at least one articulated joint by means of which the arm, or a portion of the arm may pivot relative to the base, an actuator which is operable to pivot the arm or a portion of the arm relative to the base, wherein the wire guide comprises a hook which is configured to partially or completely surround a cable from which the object is suspended, so that operation of the actuator can cause the wire guide to engage with a portion of the cable to move that portion of the cable relative to the drill floor.

The guiding apparatus may further comprise a motor which is connected to the actuator and operable to drive the actuator.

The actuator may be hydraulically operable.

The guiding apparatus may further be provided with a controller which is operable to control the operation of the actuator, and which is remote from the remainder of the guiding apparatus.

The articulated joint may form a pivotal connection between the arm and the base.

The arm may comprise a first and second portion which are joined by the articulated joint. In this case, the first end of the arm may also be pivotally mounted on the base.

A release mechanism may be provided whereby a cable enclosed by the hook of the wire guide is released if it exerts a force on the arm of the guiding apparatus of greater than a predetermined level.

The hook of the wire guide may comprise at least two hook parts each of which extends around a portion of a wire axis which is generally perpendicular to a longitudinal axis of the arm.

One of both of the hook parts may be pivotally mounted on a base part of the wire guide, the wire guide further comprising a release actuator which is operable to pivot the or each hook part relative to the base part between an open position in which ends of the hooks parts are spaced from one another so that a cable can pass between the hook parts to be partially enclosed by the hook parts, and a closed position in which the hook parts completely enclose the wire axis.

The two hook parts may be spaced from one another in a direction generally parallel to the wire axis.

The wire guide may be mounted on a holder which is pivotally connected to the second end of the arm, and the guiding apparatus further provided with a wire guide actuator which is operable to pivot the wire guide relative to the arm.

The wire guide may be mounted on a holder which is connected to the second end of the arm, the wire guide being mounted on the holder via a release mechanism which is operable to release the wire guide from the holder when a force exerted on the wire guide to separate it from the holder exceeds a predetermined level.

According to a second aspect of the invention we provide a drilling rig having a drill floor and a guiding apparatus according to the first aspect of the invention, the base of the guiding apparatus being supported on the drill floor.

The drilling rig may further comprise a derrick, a winch and a cable, the cable having a first end which is connected to the winch, a free end which can be connected to an object to be suspended above the drill floor, and an intermediate portion which is supported by the derrick.

The wire guide of the guiding apparatus may be arranged so that it surrounds or partially surrounds a portion of the cable between its free end and the intermediate portion.

A release part may be mounted on the cable below the portion of the cable surrounded by the wire guide, and where the hook of the wire guide comprises two hook parts each of which extends around a portion of a wire axis which is generally perpendicular to a longitudinal axis of the arm, and one of both of the hook parts is pivotally mounted on a base part of the wire guide, and can pivot relative to the base part between an open position in which ends of the hooks parts are spaced from one another so that a cable can pass between the hook parts to be partially enclosed by the hook parts, and a closed position in which the hook parts completely enclose the wire axis, the wire guide may be configured such that the hook parts move from the closed position to the open position when the release part engages with the hook parts and exerts a force on the hook parts which is greater than a predetermined level.

We further provide a method of moving an object around the drill floor of a drilling rig according to the second aspect of the invention wherein the method comprises:

a) connecting the free end of the cable to the object, b) operating the winch to lift the object off the drill floor, c) moving the guiding apparatus so that the hook substantially surrounds a portion of the cable, d) operating the actuator of the guiding apparatus so that the hook of the guiding apparatus exerts a force on the cable to move the object in the desired direction.

Where the hook of the wire guide comprises two hook parts each of which extends around a portion of a wire axis which is generally perpendicular to a longitudinal axis of the arm, one of both of the hook parts is pivotally mounted on a base part of the wire guide, and the wire guide further comprises a release actuator which is operable to pivot the or each hook part relative to the base part between an open position in which ends of the hooks parts are spaced from one another so that a cable can pass between the hook parts to be partially encircled by the hook parts, and a closed position in which the hook parts completely encircle the wire axis, step c of the method may comprise using the release actuator to move the hook parts to the open position, using the actuator of the guiding apparatus to move the arm towards the cable such that the cable moves to a position in which it is partially encircled by the two hook parts, and then using the release actuator to move the hook parts to the closed position so that the cable is completely encircled by the hook parts.

Where the hook of the wire guide comprises two hook parts each of which extends around a portion of a wire axis which is generally perpendicular to a longitudinal axis of the arm and the two hook parts are spaced from one another in a direction generally parallel to the wire axis, step c of the method may comprise pivoting the hook about a pivot axis so that the wire axis is generally perpendicular to the longitudinal axis of the cable, using the actuator to move the arm towards the cable so that the cable passes between the two hook parts, and then pivoting the hook about the pivot axis so that the wire axis is generally parallel to the longitudinal axis of the cable.

BRIEF DESCRIPTION OF THE DRAWINGS

These and other characteristics will become clear from the following description of illustrative embodiments, given as non-restrictive examples, with reference to the attached drawings, in which.

DETAILED DESCRIPTION

Figure 1:
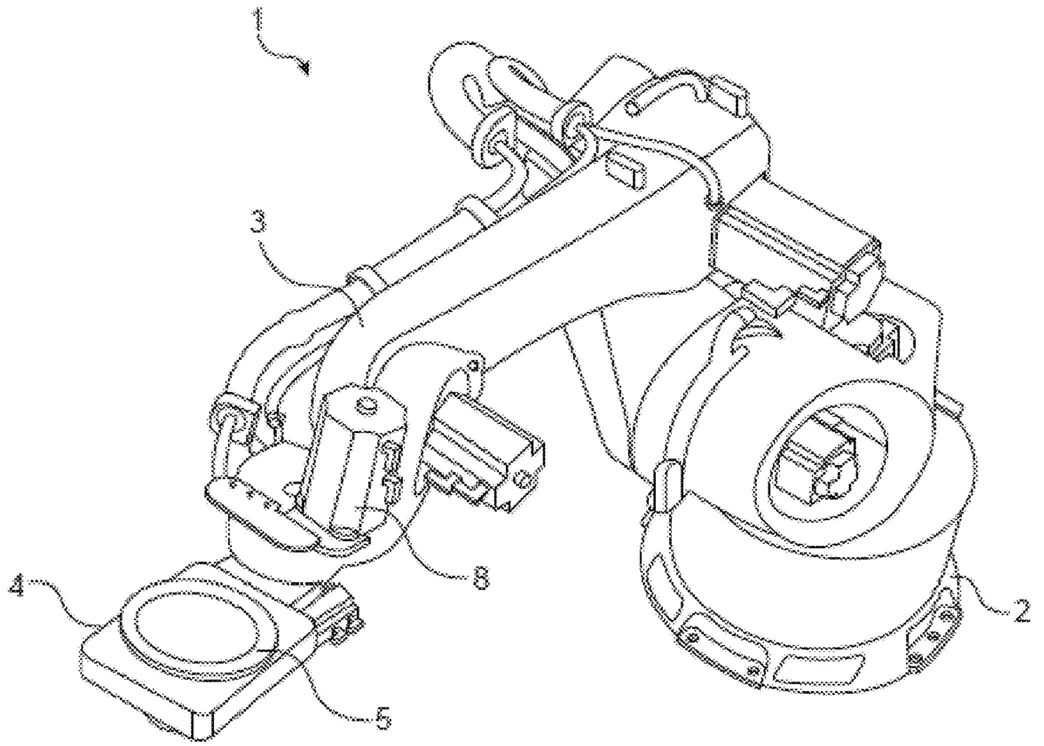
FIG. 1 illustrates a machine according to an embodiment.

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

In a first aspect, embodiments of the present disclosure provide methods and systems for handling elongate pipes at (or near) a drill floor area on a drilling rig. The integrity of the connections between such pipes are generally of high importance, particularly considering the load the pipe string is exposed to during use and the fact that the same pipe sections may be subjected to make up (connect) and break out (disconnect) operations a large number of times during its lifetime. Prior to make-up of a connection, threads may be cleaned, and dope is usually applied on the threads before connection. A thread protector is often used for protecting the threads on the tubular from wear and tear. Today, the removal and mounting of these protecting devices is normally performed manually with personnel operating at or near the drill floor. This area is typically considered a "red zone" for safety purposes, i.e. it is desirable to avoid personnel present in this area as much as possible.

Figure 2:
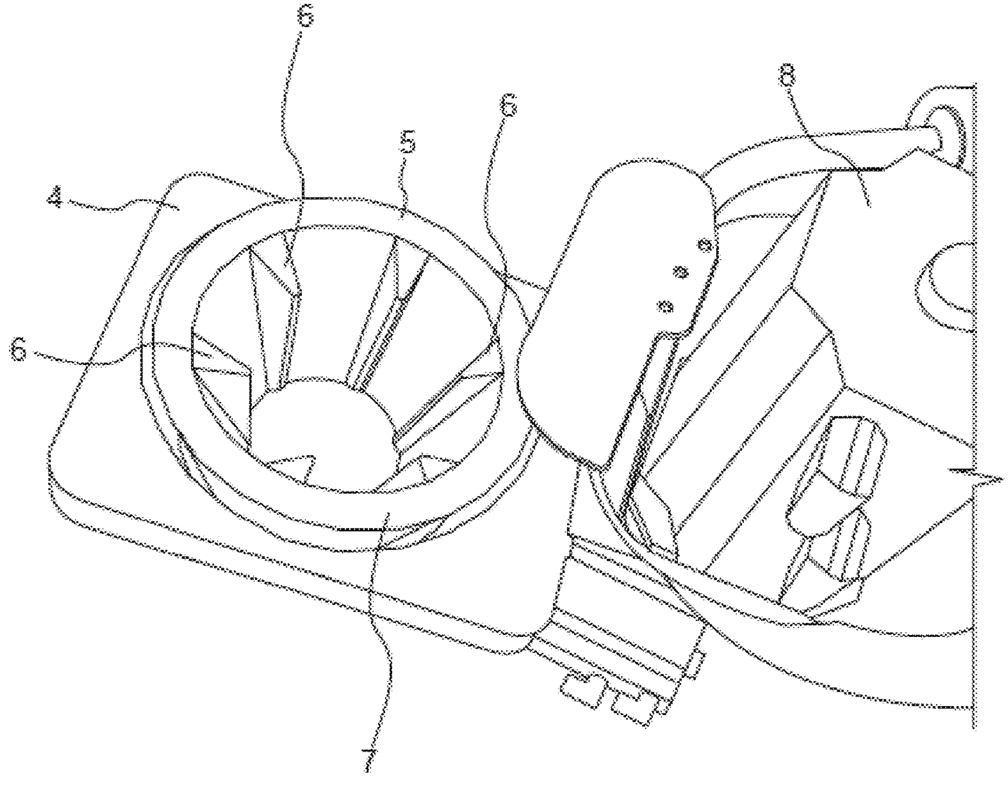
FIG. 2 illustrates details of the machine shown in FIG. 1.

FIGS. 1 and 2 illustrate a machine 1 for a drilling plant. The machine 1 has a base 2, an arm 3, and a tool 4 carried by the arm 3. The tool 4 comprises a receiver 5 for a protective cap, and the machine 1 is operable to engage the protective cap and remove or install the protective cap from or on an end of a drilling tubular, such as a drill pipe section.

Figure 3:
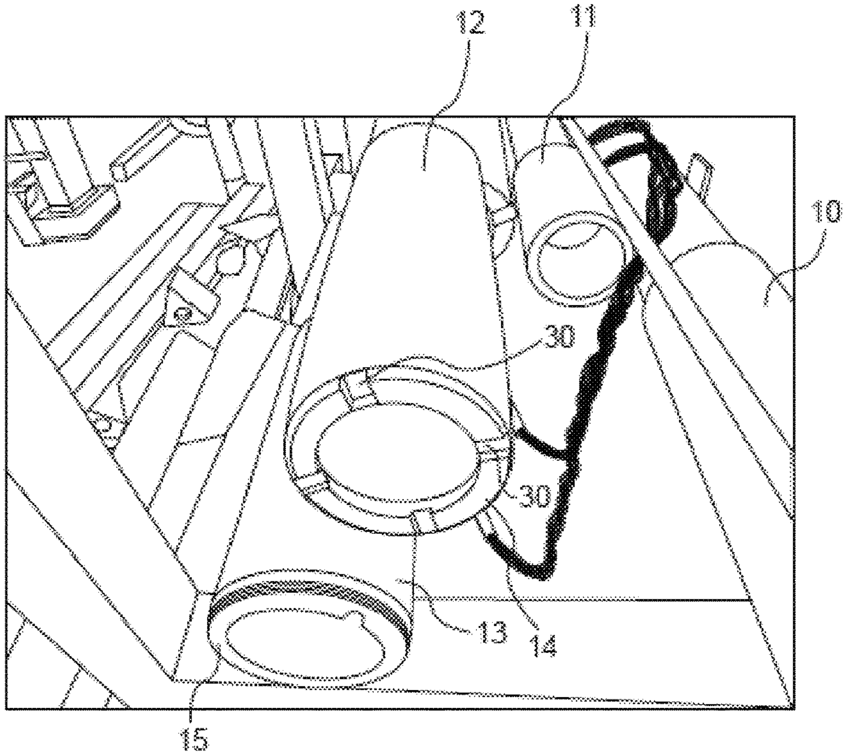
FIG. 3 illustrates tubular members for use in a drilling operation.

FIG. 3 illustrates sections of drill pipe 10-13. As can be seen, drill pipe sections 12 and 13 have protective caps 14,15 arranged at its ends. Protective cap 14 is arranged at a pin end (i.e. the male threaded end) of the pipe section 12, whereas the protective cap 15 is arranged at a box end (i.e. the female threaded end) of the pipe section 13.

As best seen in FIG. 2, the tool 4 may comprise a plurality of engagement elements 6 configured to engage an outer circumference of a protective cap 14,15 to hold the protective cap 14,15 fixed.

The engagement elements 6 may comprise, for example, a plurality of flexible members fixed on an inside of a circumferential holder 7, as shown in FIG. 2. The holder 7 may thus be a rigid or semi-rigid structure, while the engagement elements may be, for example, of an elastic material, such as rubber or similar.

Alternatively, the engagement elements 6 may be a plurality of movable arms operable to engage the outer circumference of the protective cap 14,15. The movable arms may be controllable arms which are radially movable to "grip" the protective cap 14,15 to allow the machine 1 to hold the cap for removing it or placing it on the end of the drilling tubular. Such an embodiment is described in further detail below.

The receiver 5 may be rotatable and operable to spin in or spin out the protective cap 14,15 from the end of the drilling tubular 10-13. This may be done by means of a motor 8 arranged on the arm 3. The machine 1 can thus be provided with both gripper and spin out (or spin in) functionality for the protective cap 14,15.

Alternatively, the receiver 5 may be held fixed by the machine 1, and the drilling tubular 10-13 is rotated (for example by means of a spinner tong or another pipe handling machine, such as a vertical pipe handler having grippers with spin functionality) in order to install or remove the protective cap 14,15 on or from the end of the drilling tubular 10-13.

Figure 4:
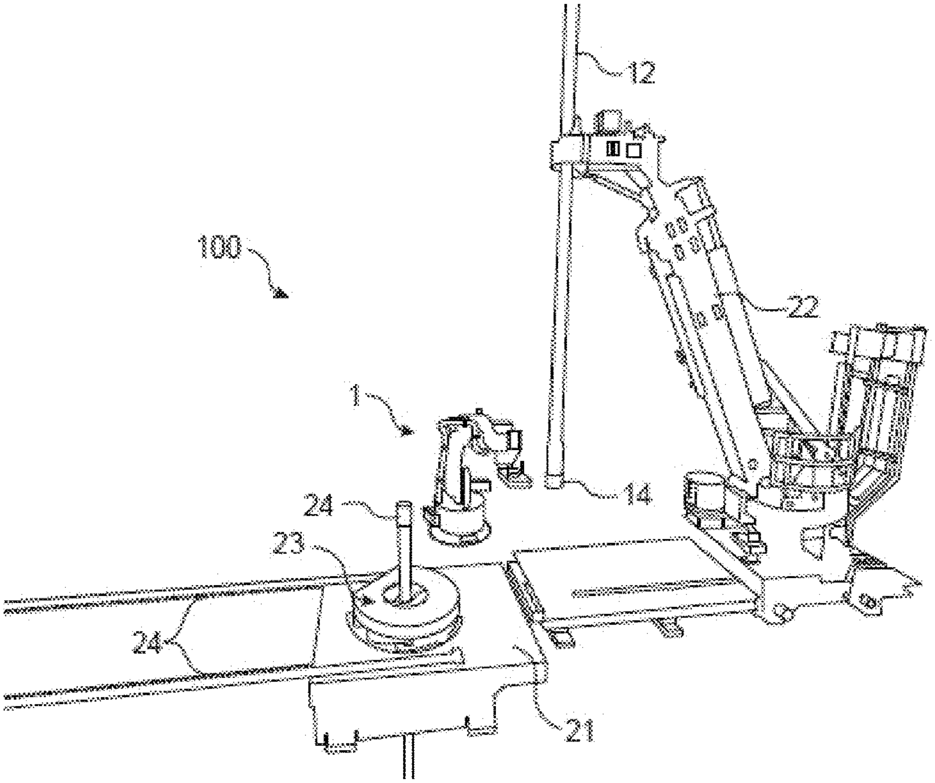
FIGS. 4-8 illustrate a drilling plant according to an embodiment.

Illustrated in FIG. 4, a drilling plant may comprise a machine 1 as described herein, where the machine 1 is arranged on or adjacent a drill floor 21. The machine 1 is operable to engage a drilling tubular 12 when the drilling tubular 12 is held in a vertical position above the drill floor 21 by a pipe handling machine 22. The machine 1 may thus be operable to extend the arm 3 above the drill floor 21. The base 2 may be placed on the drill floor 21 or beside it.

The drill floor 21 comprises a well centre opening 23. A drill string 24, made up of a plurality of drill pipe sections, may extend downwardly into a wellbore below the drill floor 21. The top end of the drill string 24 comprises a box end of a tool joint, to which the tubular 12 should be connected. A roughneck machine (not shown) is movable towards the well centre opening 23 via rails or tracks 24, in order to engage the two pipe ends and make up the connection. (Or, alternatively, break out the connection if the drill string 24 is being retrieved out of the well.)

The tubular 12 comprises a protective cap 14 at its lower end. The cap 14 protects the pin end of a lower tool joint on the tubular 12.

Figure 5:
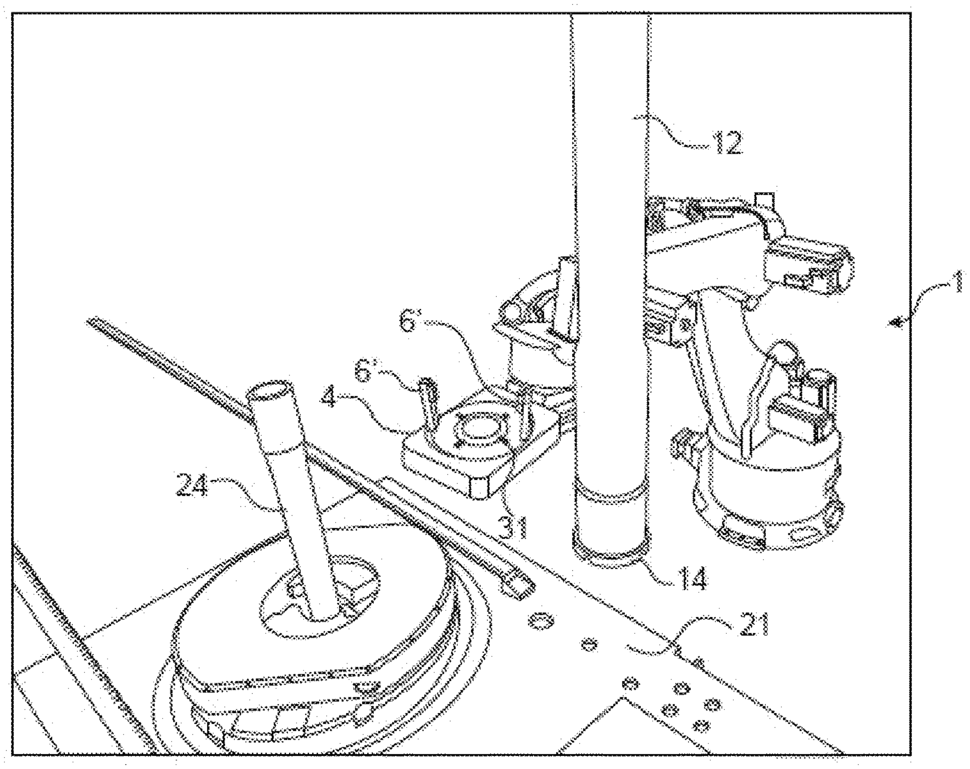

FIGS. 5-8 illustrate the process of preparing the tubular 12 for connection to the drill string 24. As shown in FIG. 5, the pipe handling machine 22 (see FIG. 4) holds the tubular 12 in a vertical orientation above the drill floor 21. The tubular 12 may be held above the well centre opening 23, or adjacent the well centre opening 23. The machine 1 is then moved such that the tool 4 can engage the protective cap 14.

As can be seen from FIG. 5, in this embodiment, the engagement elements 6' are actuatable arms (or "fingers"), which can be controlled to selectively grip and hold the protective cap 14. The arms 6' can, for example, be hydraulically controlled so as to engage the cap 14 at an outer circumference thereof.

Figure 6:
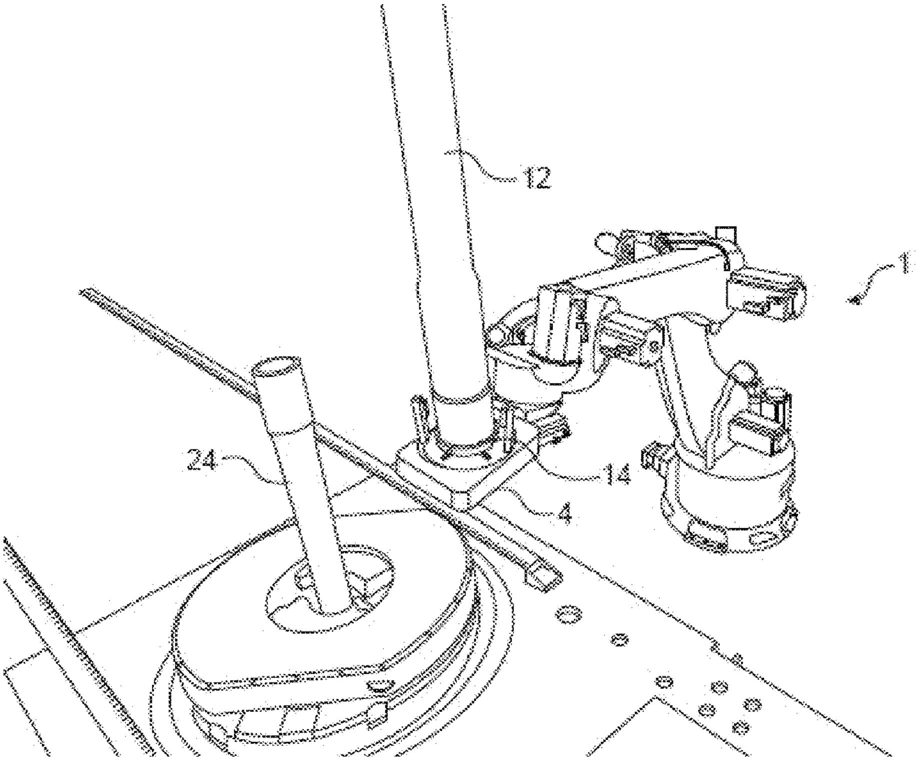
Figure 7:
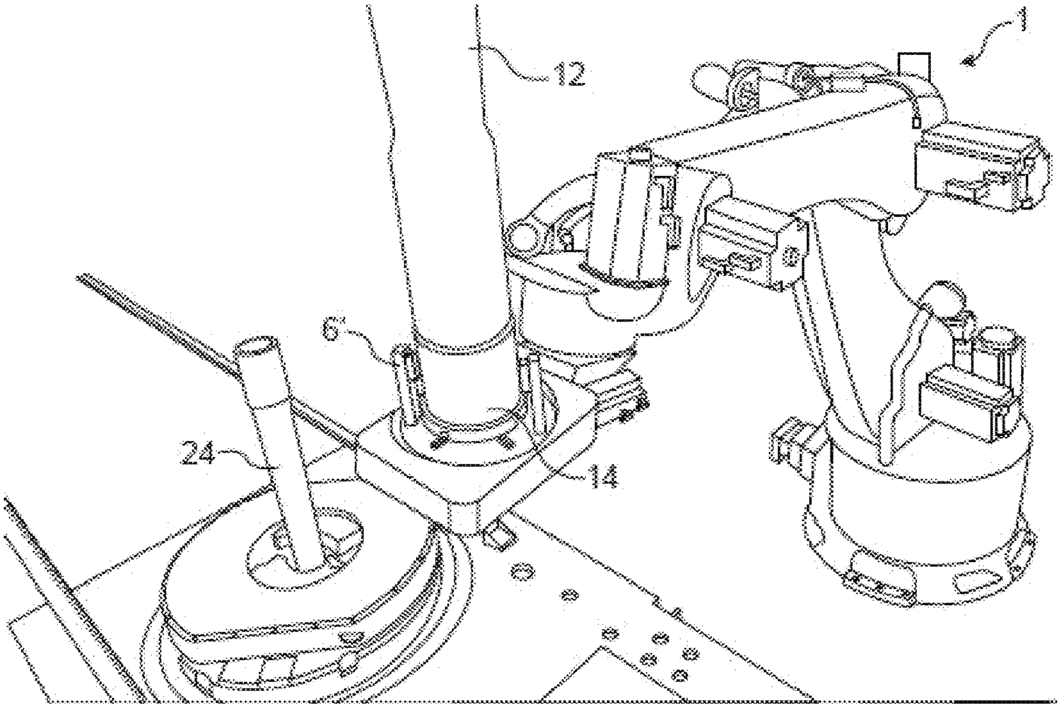
Figure 8:
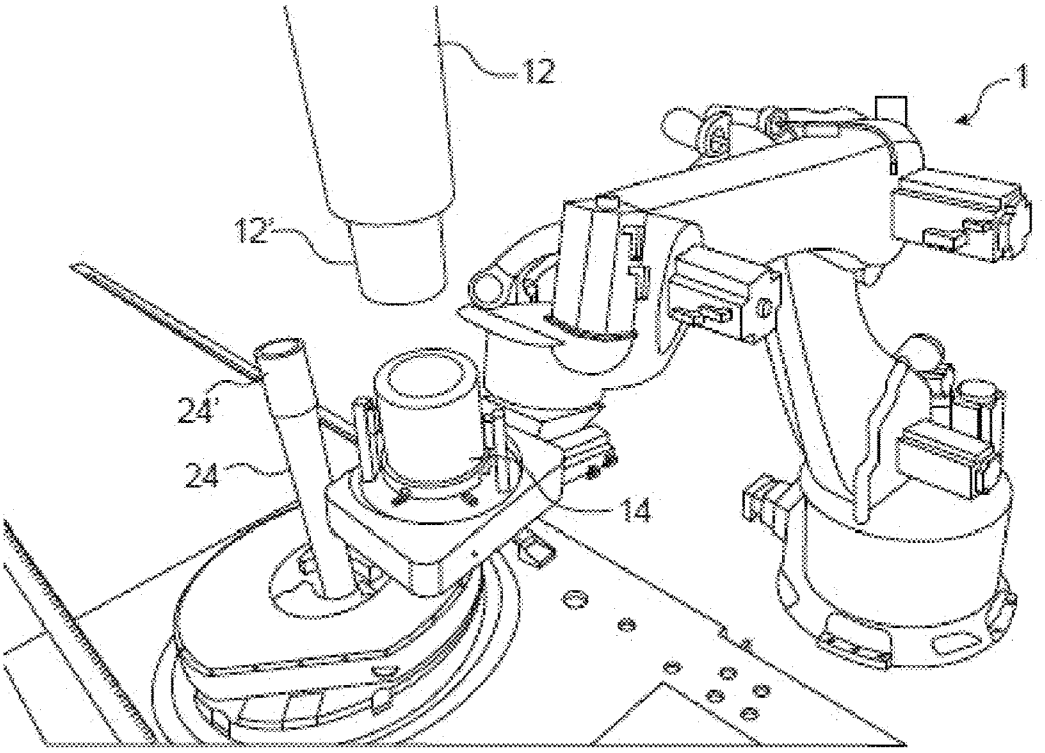

FIG. 6 illustrates the machine 1 and the pipe handling machine 22 having positioned the tool 4 directly below and adjacent the cap 14. In FIG. 7, the arms 6' have been activated so as to grip the cap 14. The tubular 12 is then rotated by means of spinners in the pipe handling machine 22 so as to spin out the threaded section 12' of the tubular 12 from the cap 14. Alternatively, as described above, the tool 4 may have this functionality, for example by arranging the arms 6' on a rotatable disc within the tool 4.

The cap 14 is then removed from the drill floor area along with the tool 4 and the arm 3. The tubular 12 is now ready for being connected to the box end tool joint 24' of the drill string 24.

Optionally, the cap 14 may have a shape, such as a protrusion, depression, slot or groove, which engages and interacts with a corresponding shape on the tool 4, which may also be a protrusion, depression, slot or groove. FIG. 3 illustrates slots 30 at an outer end of the cap 14 which engage corresponding protrusion 31 (see FIG. 5) in the tool 4. When the tool 4 is positioned such that it engages the cap 14, as in FIGS. 6-8, these shapes engage each other to provide a rotational lock between the tool 4 and the cap 14. By rotating the tool 4 (or a part thereof), or by rotating the tubular 12, a secure removal (spinning out) or installation of the cap 14 can be obtained. This may eliminate the need for the arms 6' or reduce the requirements of the arms 6', for example so that the arms 6' mainly need to hold the cap 14 in place for positioning purposes, while the torque required for spinning in or spinning out is provided through the engagement between the corresponding shapes.

The machine 1 may be arranged to pick up or lay down the protective caps from a separate storage. The separate storage may be spaced from the drill floor, or at least spaced from a red zone on the drill floor. The machine 1 may be configured to automatically lay down or pick up protective caps, or there may be personnel present to do this, for example placing a cap in the receiver 5 or removing a cap from the receiver 5. Advantageously, the personnel required for this operation can be located in a safe area (or a safer area) compared to the drill floor and/or the red zone. The red zone may, for example, be considered to be the operating area of the pipe handling machine 22.

With reference to FIG. 4, the storage area may be located behind the machine 1, i.e. such that the machine 1 is arranged between the storage area and the well centre opening 23. This means that personnel will not be required to enter the area around the well centre opening 23 where the pipes are handled (typically considered to be a red zone area) to remove the protective cap 14.

Figure 9:
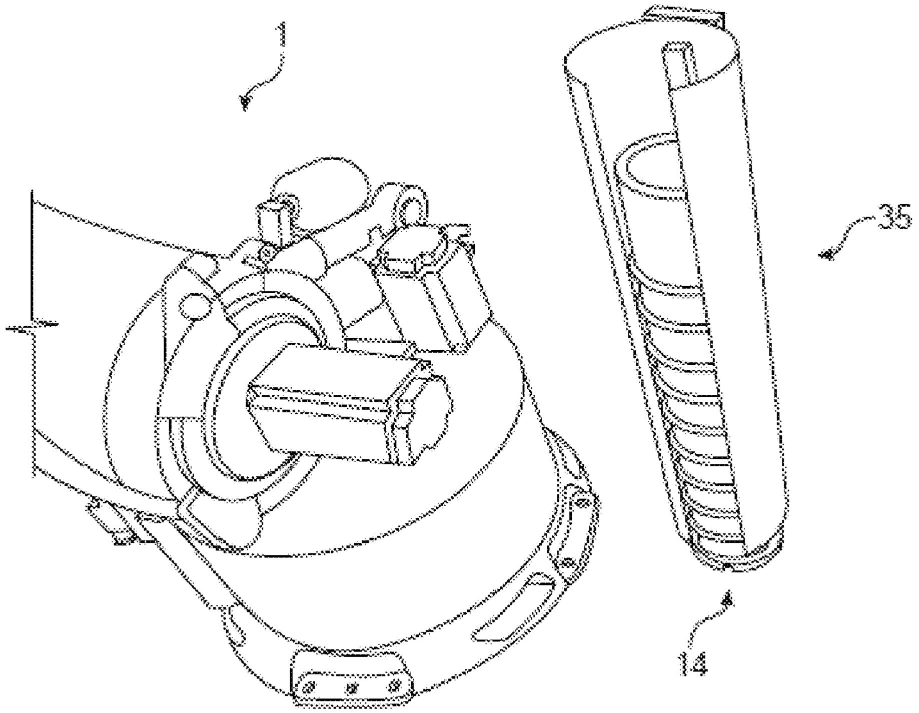
FIGS. 9-11 illustrate an embodiment of a drilling plant comprising a magazine.
Figure 10:
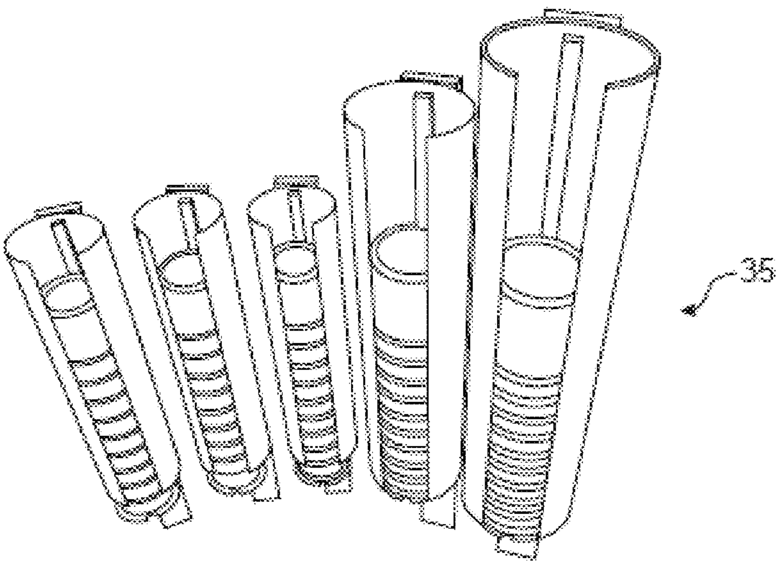
Figure 11:
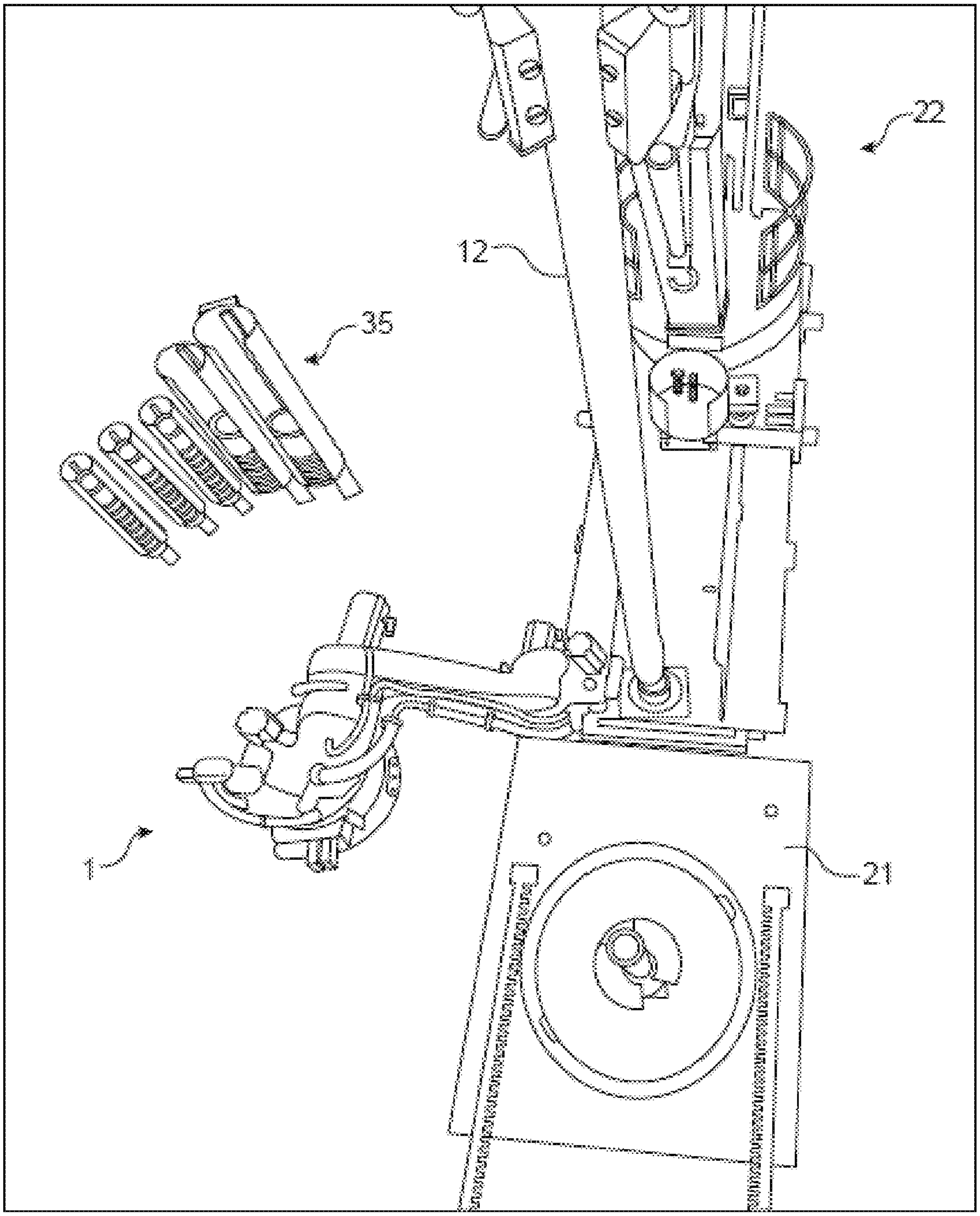

Illustrated in FIGS. 9-11, in one embodiment, the storage area comprises a magazine 35 for storing a plurality of caps 14. The magazine 35 may be arranged within a reaching distance of the machine 1, as illustrated in FIG. 9.

Shown in FIG. 10, the magazine 35 may have a plurality of individual magazine units. In this embodiment, the magazine 35 comprises a tube-shaped structure to hold the (generally cylindrical) caps 14. The magazine 35 may be arranged so that the machine 1 is operable to pick up and/or place a cap 14 from/into the magazine 35 without human intervention. For example, in this embodiment, the tube may allow stacking of the caps 14 from the bottom, such that the machine 1 can pick up a cap 14 from the bottom at any time (or place a cap 14 in the bottom of the stack), akin to a cup dispenser type arrangement. The tube may for example have a spring-loaded mechanism inside, if necessary, to hold the caps 14 in place and ensure that one cap 14 is always available at the bottom. The machine 1 may then move the tool 4 to the magazine 35, engage the arms 6' to pick up the lowermost cap 14, and move the tool 4 towards the tubular 12, or conversely remove a cap 14 from the tubular 12 and move to the magazine 35 while holding the cap 14 with the arms 6', and place the cap 14 in the bottom of the magazine 35. Optionally, a human operator may be positioned near the magazine 35 to assist with these operations.

The machine 1 may be controlled by an operator which is, for example, within a driller's cabin or from a location at or near the drill floor, but which is not directly within the red zone area. Alternatively, or additionally, the machine 1 may be automatically or semi-automatically controlled with sensors and e.g. cameras assisting the machine 1 when moving the tool 4 towards the drilling tubular end.

Advantageously, systems and methods of the first aspect allow drilling operations to be carried out in a safer and more efficient manner, for example by means of removal of personnel in red zone on drill floor.

In a second aspect, there is provided apparatus for and method of cleaning a drill string used for drilling a wellbore for oil and/or gas production.

When a pipe section is retrieved from a well bore, chunks of clay or other debris are typically stuck to the pipe section. Typically, these are removed manually by a member of the rig crew in the red zone using a pressure washer as the pipe section is pulled up above the drill floor.

It is known to provide for automatic cleaning of the BHA and casing using a washer which is mounted in the rotary under the drill floor. The washer includes an inner ring with 5-7 nozzles in a circle through which water from the rig's high-pressure cleaning system is sprayed onto the BHA as it moves upwards to the well centre opening in the drill floor. The flow of water to the nozzles is controlled using a valve which is operated remotely using a spring loaded foot pedal or an on/off switch in the driller's cabin.

Figure 12:
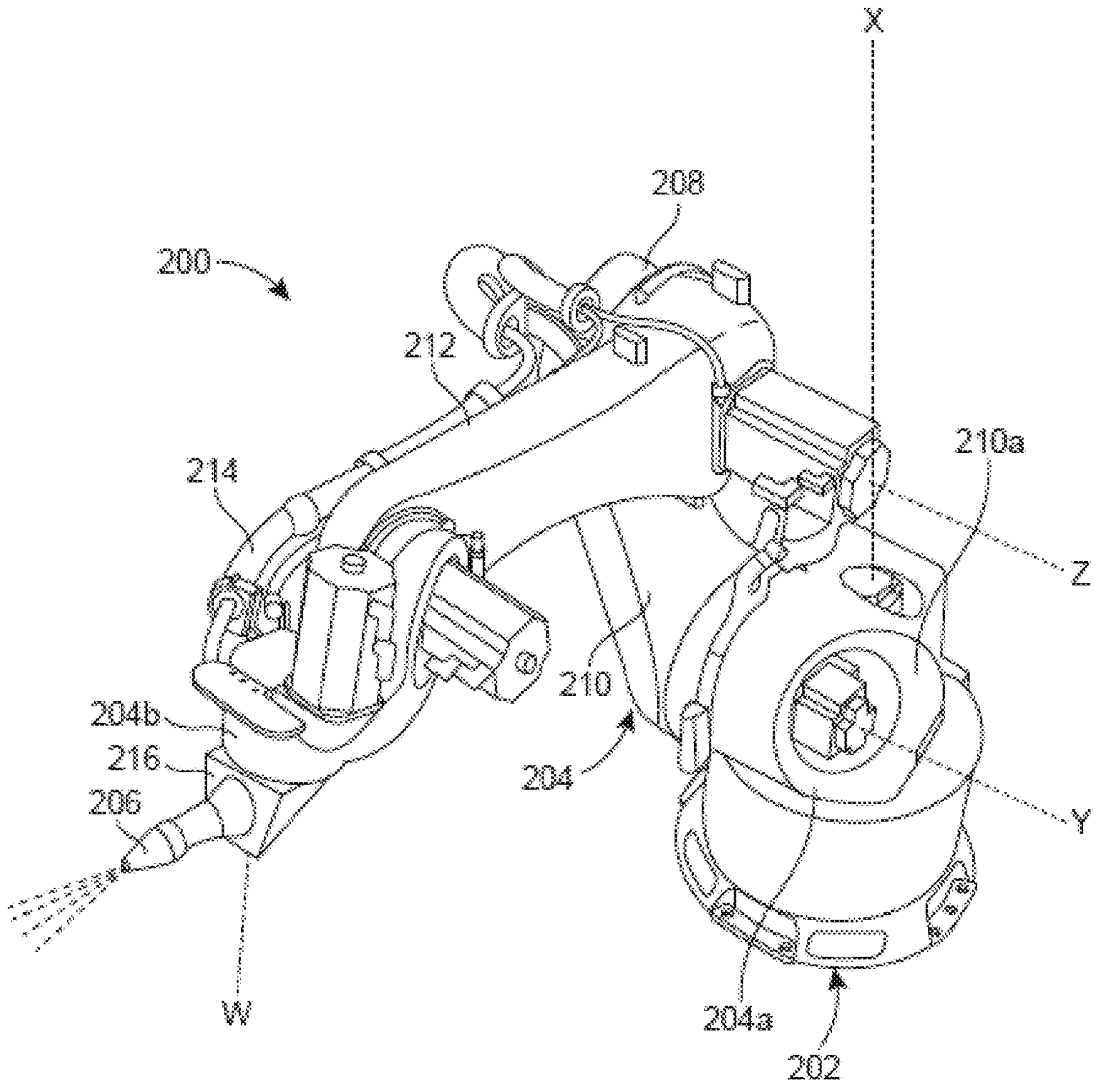
FIG. 12 is an illustration of an apparatus according to a second aspect.

Referring to FIG. 12, there is shown a cleaning apparatus 200 for cleaning a drill string, the apparatus 200 having a base 202 and an arm 204, the base 202 being configured to support the arm 204 on a drill floor of a drilling rig. The arm 204 has a first end 204*a* which is mounted on the base 202, a second end 204*b* at which is provided a spray nozzle 206 and at least one articulated joint 208 by means of which the arm 204, or a portion of the arm 204 may pivot relative to the base 202. The apparatus further comprises a motor (hereinafter referred to the arm motor) which is operable to pivot the arm 204 about the articulated joint 208 to alter the position of the spray nozzle 206 relative to the base 202.

In this embodiment, the arm 204 comprises a first portion 210 and second portion 212 which are joined by the articulated joint 208. In this example, the articulated joint is configured to allow the second portion 212 to pivot relative to the first portion 210 about an axis Z which is generally parallel to a surface on which the base 202 is supported (not shown). It will be appreciated that this need not be the case, however, and the articulated joint could equally comprise a pivotal connection between the first end 204*a* of the arm 204 and the base 202.

A first end 210*a* of first portion 210 of the arm 204 is pivotally mounted on the base 202. In this example, the first end 210*a* of the first portion 210 is pivotally connected to the base 202 to pivot relative to the base 202 about an axis X which is generally perpendicular to a surface on which the base 202 is supported. Moreover, in this embodiment, the joint between the first portion 210 and the base 202 is configure to allow the first portion 210 of the arm 204 to pivot relative to the base 202 about an axis Y which is generally parallel to a surface on which the base 202 is supported. This need not be the case, however. The first end 210*a* of the first portion 210 of the arm 204 could be fixed to the base, or pivotal about only one of these axes X, Y.

The arm motor is operable to pivot the second portion 212 of the arm relative to the first portion 210 of the arm about the articulated joint 208, and to pivot the first portion 210 of the arm 204 relative to the base 202. In this embodiment, the arm motor is operable to carry out pivoting of the arm 202 about each pivot axes, X, Y Z independently of the others, and may comprise a plurality of separate motors.

In this embodiment, the arm motor is hydraulically operable.

The apparatus 200 further comprises a fluid flow conduit 214 which is connected to the spray nozzle 206 so the pressurised fluid entering the fluid flow conduit 214 can spray out of the spray nozzle 206. A valve system (not shown) is also provided to control flow of pressurised fluid along the fluid flow conduit 214 to the spray nozzle 206.

The fluid flow conduit 214 and valve system can be mounted on the arm 204, but need not be. It could, for example, comprise a hose which extends directly from a fluid source to an inlet port on the spray nozzle 206. The valve system may be mounted on the spray nozzle 206 to control flow of fluid from the hose into the inlet port, or be provided in the hose itself.

In this embodiment, the spray nozzle 206 is mounted on a holder 216 which is pivotally connected to the second end 204*b* of the arm 204, and the arm motor is operable to pivot the spray nozzle 206 and holder 2016 relative to the arm 204, about an axis W which, in this example, is generally perpendicular to the second portion 212 of the arm 204.

Figure 13:
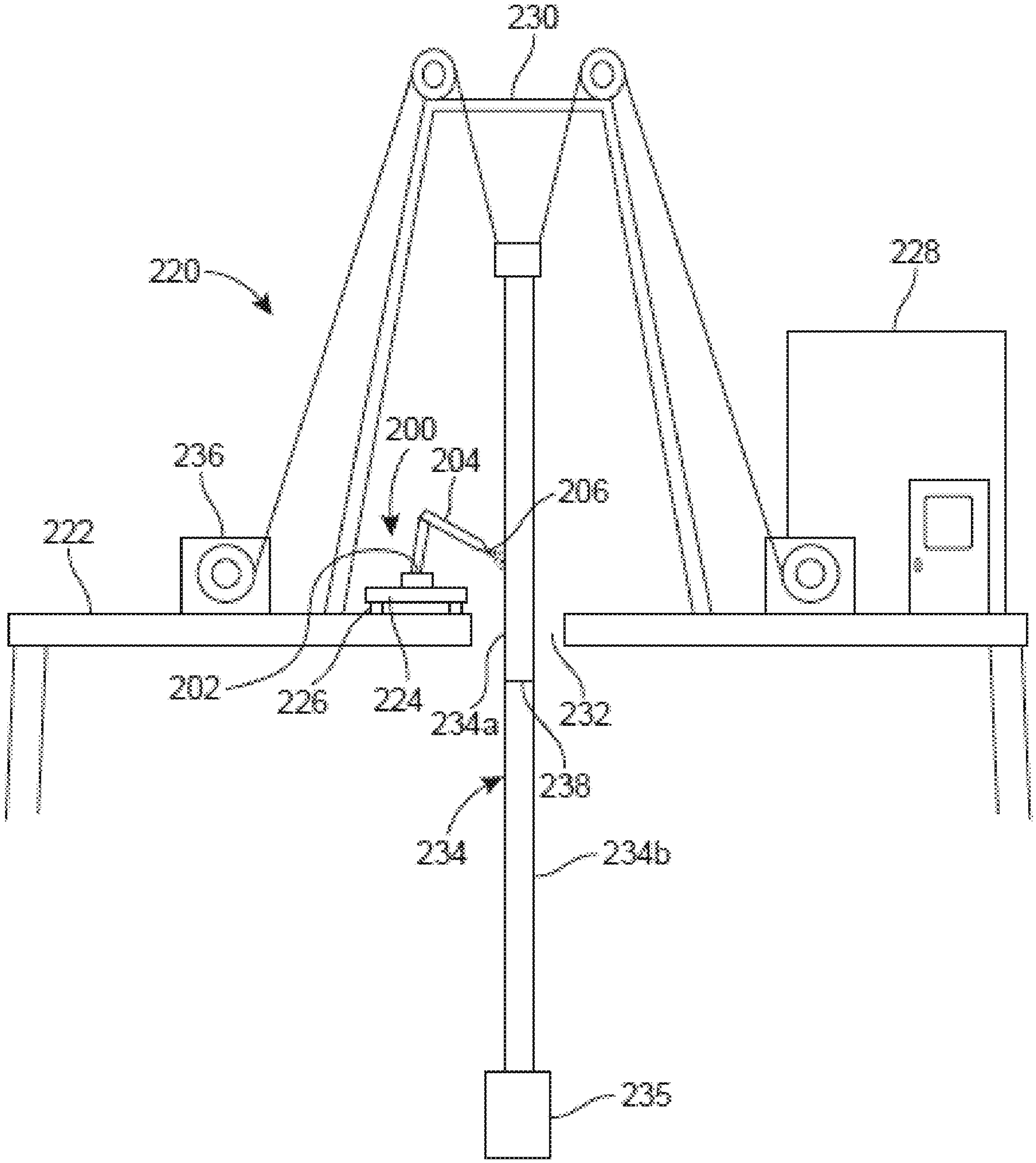
FIG. 13 is a schematic illustration of a drilling rig according to the second aspect.

Referring now to FIG. 13, there is shown a drilling rig 220 having a drill floor 222 and a cleaning apparatus 200 as described above, on the drill floor 222. In this case, the base 202 is mounted on a trolley 224 which has wheels 226 which are operable to move the base 202 and arm 204 around the drill floor 222. It will be appreciated that the trolley could equally be provided by tracks, Mecanum or omni wheels, or any other suitable motive means for moving it around the drill floor.

Advantageously the wheels 226 are powered by a trolley motor which operable remotely, for example, from a driller's cabin 228 adjacent the drill floor 222. In a preferred embodiment, the arm motor provided to cause pivoting of the arm 204 about the various pivot axes X, Y, Z and the spray holder about axis W is also controlled remotely, preferably from the driller's cabin 228 also. Similarly means to control the operation of the valve system to control flow of fluid to the spray nozzle 206 remotely, preferably from the driller's cabin 228, is also provided.

This remote control may be achieved by a wired or wireless connection to the trolley motor or arm motor, and valve system.

The fluid flow conduit 214 is connected to a source of pressurised water, for example the rig's high-pressure cleaning system.

The drill floor 222 is provided with a derrick 230 and an aperture 232 which is below the derrick 230, through which a drill string 234 extends. The drill string 234 is made up of a plurality of pipe sections 234*a*, 234*b* which are joined end to end. A bottom hole assemble (BHA) 235 is provided at the lowermost end of the lowest pipe section.

The drilling rig 220 is further provided with an elevator, or drawworks 236 by means of which the drill string 234 is suspended from the derrick 230. The drawworks 236 is operable to lower the drill string 234 in order to drill a wellbore, and to raise the drill string 234 to remove the drill string 234 from the wellbore.

The cleaning apparatus 200 may be used in the following way.

After drilling a section of wellbore, the drawworks 236 are operated to lift the drill string 234 through the aperture 232 in the drill floor 222, and the valve system is operated to allow flow of pressurised water to the spray nozzle 206 of the cleaning apparatus 200. The cleaning apparatus 200 is positioned, using the trolley motor, and the arm motor or motors is/are operated, and the valve system operated to allow flow of pressurised water to the spray nozzle 206 so that the water spray from the spray nozzle 206 is directed onto the drill string 234 as it is lifted, in order to remove any chunks of clay or other debris from the outside of the drill string 234.

The trolley motor may be operated to move the cleaning apparatus 200 around the drill string 234 as it is lifted, in order to clean all the way around the drill string 234. Alternatively, this may be achieved by operating the arm motors to move the arm 204 around the drill string 234, or by a combination of arm and trolley movement. The arm motor or motors may also be operated to move the spray nozzle 206 up and down along the longitudinal axis of the drill string 234 to improve the effectiveness of the water spray at cleaning the drill string 234.

The drawworks 236 may be operated to lift the drill string 234 so that a joint 238 between a first, uppermost, pipe section 234*a* and a second pipe section 234*b* directly below the first pipe section 234*c* is above the drill floor 222. Slips are then set around the upper end of the second pipe section 234*b* so that the uppermost end of the second pipe section 234*b* is supported by the drill floor 222, and the first pipe section 234*a* disconnected from the second pipe section 234*b*. Again, the cleaning apparatus 200 is positioned, using the trolley motor, and the arm motor or motors is/are operated so that the water spray from the spray nozzle 206 is directed onto the joint at the lowermost end of the first pipe section 234*a*, in order to remove any chunks of clay or other debris from the outside of the joint 238.

The arm motor or motors of the cleaning apparatus 200 may then be operated so that the water spray is directed onto the joint at the uppermost end of the second pipe section 234*b*.

Removal of dirt and debris from any threaded portion and seals of the joint 238 is particularly important to ensure the integrity of the joint 238 when the joint 238 is made up again in the future, as retained dirt or debris on the joint could damage the thread or seals.

As before, the trolley motor may be operated to move the cleaning apparatus 200 around the drill string 234, in order to clean all the way around the joint 238. Alternatively, this may be achieved by operating the arm motors to move the arm 204 around the drill string 234, or by a combination of arm and trolley movement. The arm motor or motors may also be operated to move the spray nozzle 206 up and down along the longitudinal axis of the drill string 234 to improve the effectiveness of the water spray at cleaning the joints.

Once the joint 238 is cleaned, the first pipe section 234*a* may be detached from the draw works 236 and run to a storage destination such as the fingerboard, pipe deck or shop. The draw works 236 may then be attached to the uppermost end of the second pipe section 234*b*, the slips removed, and the draw works 236 operated to lift the second pipe section 234*b*. The cleaning apparatus 200 may then be operated as described above to clean the second pipe section 234*b* as it is lifted, and the process of cleaning the joint repeated for the joint at the lowermost end of the second pipe section 234*b* and the uppermost end of the pipe section below.

When the pipe section in the slips is the last in the drill string 234, and, as such, has the BHA 235 at its lowermost end, the BHA 235 may be cleaned by using the draw works 236 to lift the last pipe section so that the BHA is suspended above the drill floor 222. The cleaning apparatus 200 may then be used, as described above, to clean the BHA 235.

The cleaning apparatus 200 can also be used in a similar fashion to clean the hydraulic rough neck dieses and spinner rollers, and as the cleaning apparatus 200 can be operated remotely, the cleaning can be carried out without using personnel in the red zone.

Alternative embodiments of spray nozzle 240 which could be used in the cleaning apparatus 200 are illustrated in FIGS. 14*a*, 14*b*, 15*a*, and 15*b*. In these embodiments, the spray nozzle comprises at least two spray parts each of which extends around a portion of a nozzle axis and is provided with a plurality of fluid exit apertures which are arranged so that fluid ejected from the spray nozzle forms jets from exit apertures generally towards the nozzle axis from a range of directions, the two spray parts being spaced from one another in a direction generally parallel to the nozzle axis.

Figure 14A:
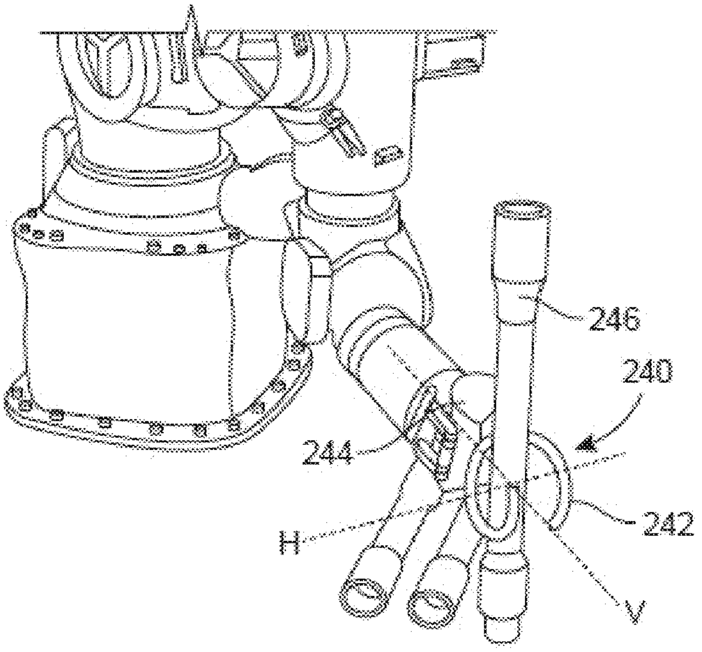
FIGS. 14*a* and 14*b* are illustrations of an alternative embodiment of spray nozzle suitable for use in the apparatus illustrated in FIG. 12, with a) the spray nozzle in an engage/release position, and b) the spray nozzle in an operative position.
Figure 14B:
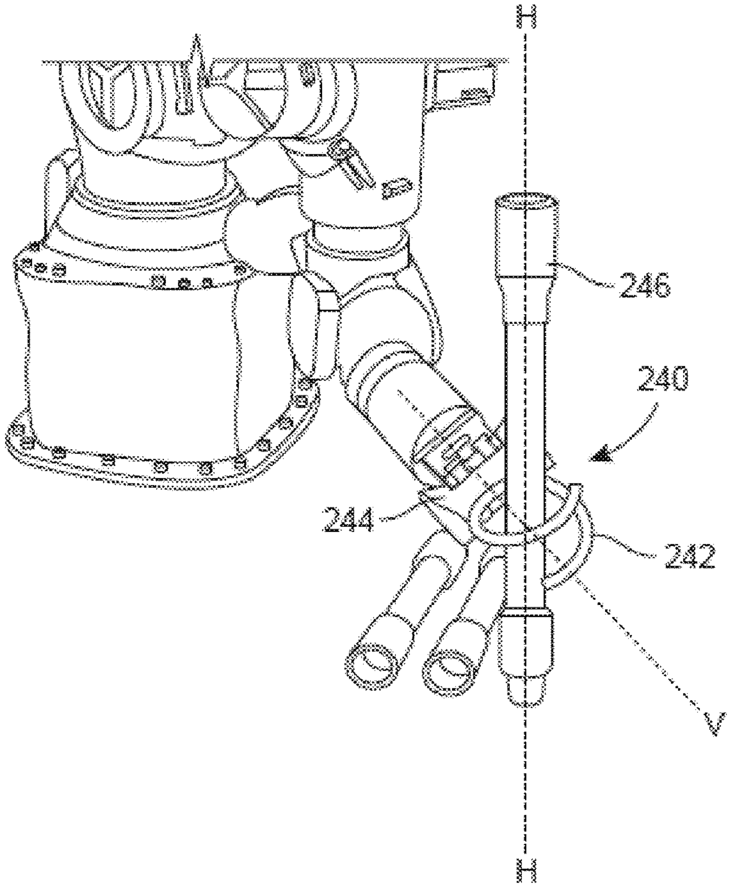

In the first embodiment, illustrated in FIGS. 14*a*, 14*b*, the spray nozzle 240 comprises a tube 242 which is curved to form part of a helix (in this example just over one turn of a helix), with an axis H. It will be appreciated, however, that the tube 242, need not be exactly helical, and may simply be curved around a generally nozzle axis H so that when viewed parallel to the nozzle axis H, the nozzle axis H is surrounded completely, or almost completely, by the tube 242.

Both ends of the tube 242 are closed, and the tube 242 is provided with a plurality of apertures on the portions of its surface facing nozzle axis H. An inlet port is provided in a portion of the surface of the tube 242 facing away from the axis H, and the inlet port connected to the fluid flow conduit 214, so that pressurised fluid from the fluid flow conduit 214 enters the tube 242 via the inlet port and exits in a series of radially inwardly directed jets. In this example, the inlet port is located generally centrally between the ends of the tube 242, but this need not be the case, and the inlet port could be at or closer to one of the ends of the tube 242.

The tube 242 is mounted on a holder 244 which is mounted on the end of the second portion 212 of the arm 204, the arm motor being operable to pivot the holder 244 relative to the arm about an axis V which, in this case, is generally parallel to the second portion 212 of the arm 204. The tube 242 is arranged on the holder 244 such that the nozzle axis H of the tube 242 is generally perpendicular to the pivot axis V.

The cleaning apparatus 200 fitted with this embodiment of spray nozzle 240 may be used to clean around an elongate part 246 such as a wire, cable or tubular, by operating the arm motor to pivot the holder 244, and/or the arm 204 or a portion thereof, such that the helix axis H of the tube 242 is perpendicular to the longitudinal axis of the elongate part 246 (the engage/release position). The arm motor can then be operated move the spray nozzle 240 towards the elongate part 246 so that the elongate part 246 passes between the two ends of the tube 242 (as illustrated in FIG. 14*a*) to a position in which the arm motor can be operated to pivot the holder 216 and/or the arm 204 or a portion thereof so that the helix axis H of the tube 242 is either generally parallel, or more preferably coincident with the longitudinal axis of the elongate part 246, as illustrated in FIG. 14*b*. In the latter position (hereinafter referred to as the operative position), when cleaning fluid is pumped along the fluid flow conduit 214 and into the tube 242, the cleaning fluid sprays out of the apertures onto the elongate part 246. As the tube 242 extends around the entire perimeter of the elongate part 246, cleaning fluid can be directed onto all parts of the outermost surface of the elongate part 246 simply by moving the elongate part 246 parallel to its longitudinal axis. To improve the cleaning effect, the arm motor can be operated to move the spray nozzle 240 parallel to the longitudinal axis of the elongate part 246 in a reciprocating, up and down or back and forth manner whilst the elongate part 246 is moving parallel to its longitudinal axis or is stationery.

Figure 15A:
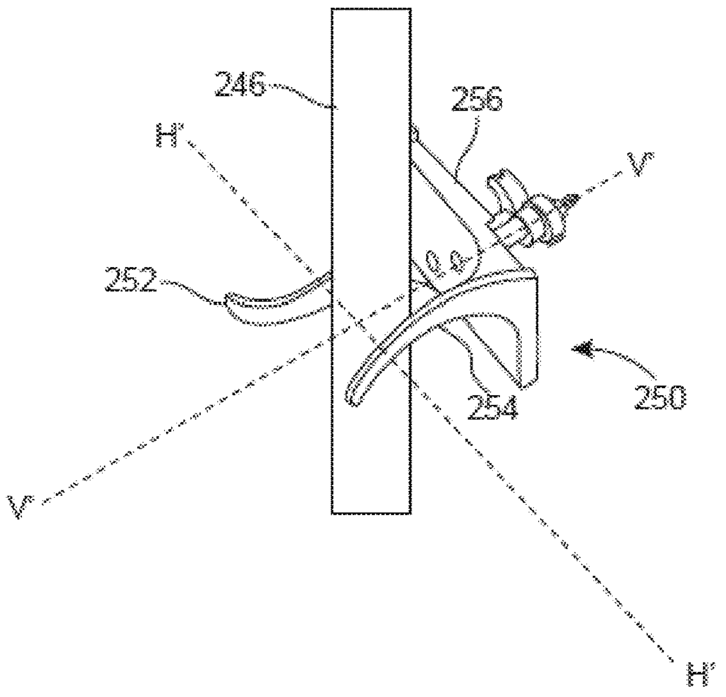
FIGS. 15*a* and 15*b* are illustrations of a further alternative embodiment of spray nozzle suitable for use in the apparatus illustrated in FIG. 12, with a) the spray nozzle in an engage/release position, and b) the spray nozzle in an operative position.
Figure 15B:
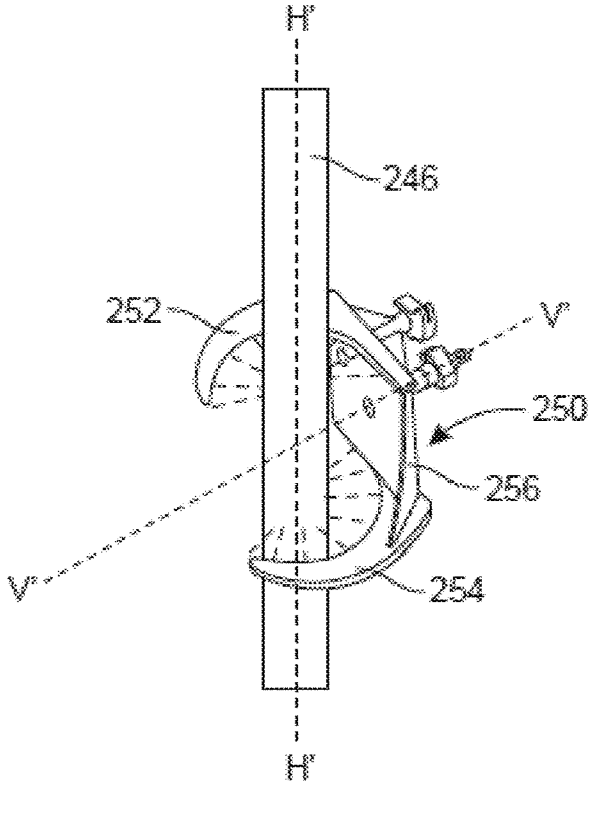

A further alternative embodiment of spray nozzle 250 is illustrated in FIGS. 15*a* and 15*b*. In this embodiment, the spray nozzle 250 has two curved spray tubes 252, 254 which, in this example, have a first portion which each extend along opposite sides of a generally rectangular manifold plate 256 and a second portion which extends outwardly from diagonally opposite corners of the manifold plate 256. The second portions of the tubes 252, 254 extend initially in a direction which is perpendicular to the manifold plate 256 (both tubes 252, 542 extending outwardly from the same side of the manifold plate 256) and then curve inwardly with respect to the manifold plate 256 back towards the first portions, so that the tubes 252, 254 both lie along an arc around a nozzle axis H' which is parallel to two of the edges of the manifold plate 256, and spaced from the manifold plate 256. As such, the tubes 252, 254 curve around the nozzle axis H' so that when viewed parallel to the axis H', the axis H' is surrounded completely, or almost completely, by the tubes 252, 254.

The ends of both tubes 252, 254 are closed, and are provided with a plurality of apertures on their inward facing (i.e. facing towards the nozzle axis H') surfaces. An inlet port is provided in the manifold plate 256, and is connected to the interiors of both tubes 252, 254. The inlet port is connected to the fluid flow conduit 214, so that pressurised fluid from the fluid flow conduit 214 enters the tubes 252, 254 via the inlet port and exits the apertures in a series of radially inwardly (i.e. towards the nozzle axis H') directed jets as illustrated in FIG. 15*b*.

The manifold plate 256 is mounted on a holder which is mounted on the end of the second portion 212 of the arm 204, the arm motor being operable to pivot the manifold plate 256 relative to the arm 204 about an axis V' which, in this case, is generally parallel to the second portion 212 of the arm 204. The manifold plate 256 is arranged on the holder such that nozzle axis H' is generally perpendicular to the pivot axis V'.

The cleaning apparatus 200 fitted with this embodiment of spray nozzle 250 may be used to clean around an elongate part 246 such as a wire, cable or tubular in much the same way as the cleaning apparatus 200 fitted with the spray nozzle 240 illustrated in FIGS. 14*a* and 14*b*, by operating the arm motor to pivot the holder 216, and/or the arm 204 or a portion thereof, such that the nozzle axis H' is perpendicular to the longitudinal axis of the elongate part 246 (the engage/release position). The arm motor can then be operated move the spray nozzle 250 towards the elongate part 246 so that the elongate part 246 passes between the ends of the tubes 252, 254 (as illustrated in FIG. 15*a*) to a position in which the arm motor can be operated to pivot the holder 216 and/or the arm 204 or a portion thereof so that the nozzle axis H' is either generally parallel, or more preferably coincident with the longitudinal axis of the elongate part 246, as illustrated in FIG. 15*b*. In this operative position, when cleaning fluid is pumped along the fluid flow conduit 214 and into the tube 242, the cleaning fluid sprays out of the apertures onto the elongate part 246. As the tubes 252, 254 extend around the entire perimeter of the elongate part 246, cleaning fluid can be directed onto all parts of the outermost surface of the elongate part 246 simply by moving the elongate part 246 parallel to its longitudinal axis. To improve the cleaning effect, the arm motor can be operated to move the spray nozzle 240 parallel to the longitudinal axis of the elongate part 246 in a reciprocating, up and down or back and forth manner whilst the elongate part 246 is moving parallel to its longitudinal axis or is stationery.

It will be appreciated that the provision of a spray nozzle 240, 250 with a plurality of radially inwardly directed jets which are produced by a part or parts which can be arranged to surround the entire or almost the entire perimeter of the part to be cleaned is advantageous, as it may eliminate the need to operate the arm motor or trolley motor to move the spray nozzle 240, 250 around the part to be cleaned.

Whilst this could be achieved using spray nozzle which is circular, placement of a circular spray nozzle around an elongate part, and removal of the spray nozzle from around an elongate part, would be impractical and impossible if an end of the elongate part were not accessible. A split ring nozzle could be used, but by providing a split big enough for the elongate part to pass through would mean that some movement of the spray nozzle around the elongate part would be required to ensure that cleaning fluid is sprayed onto all parts of the outwardly facing surfaces of the elongate part. This problem is solved by the arrangements illustrated in FIGS. 14*a*, 14*b*, 15*a* and 15*b*, in which jets of cleaning fluid are ejected from parts which curve around a nozzle axis but which are spaced from one another generally parallel to the nozzle axis.

It should be appreciated that, whilst in the embodiments described above, rotation of the spray nozzle 240, 250 between the engage/release position (in which the nozzle axis H, H' is generally perpendicular to the longitudinal axis of the elongate part to be cleaned) and the operative position (in which the nozzle axis H, H' is generally parallel to the longitudinal axis of the elongate part to be cleaned) can be achieved by operating the arm motor to pivot the spray nozzle 240, 250 relative to the arm 204, the spray nozzle 240. 250 need not be pivotally mounted on the arm 204. In this case, rotation of the spray nozzle 240, 250 between the engage/release position and the operative position could be achieved by operating the arm motor to pivot the arm 204 relative to the base 202.

It will be appreciated that the arm motor may comprise a single motor which is operable to causes pivoting about each pivot axes, X, Y, Z, W, V, or V' independently of the others, or may comprise a plurality of separate motors each of which is operable to cause pivoting about one or more of the pivot axes X, Y, Z, W, V, V'. The term "motor" is therefore intended to cover either a single motor, or a plurality of motors.

A third aspect relates to apparatus for and method of handling short tubulars on a drilling rig during drilling a well bore or during or oil and/or gas production.

Sometimes a short tubular or sub, is secured to the top of the drill string. The subs are generally stored on a pallet with a plurality of vertical rods extending upwardly from its uppermost surface, each subs being placed with one end over one of the rods so that the sub is supported in a vertical or near vertical orientation. In order to lift one of the subs, it is attached to cable, which extends from the sub over the derrick, and down to a winch located on the drill floor. The winch may then be operated to reel in the cable, and lift the sub off the drill floor. Operators on the drill floor push or pull the cable above the sub to manoeuvre the sub in a generally horizontal plane so that it is vertically above the uppermost end of the drill string, before the winch is operated to lower the sub onto the top of the drill string. A winch and cable may also be used to lift other heavy items off the drill floor, with operators manually moving the item in a generally horizontal direction around the drill floor to the desired location.

Figure 16:
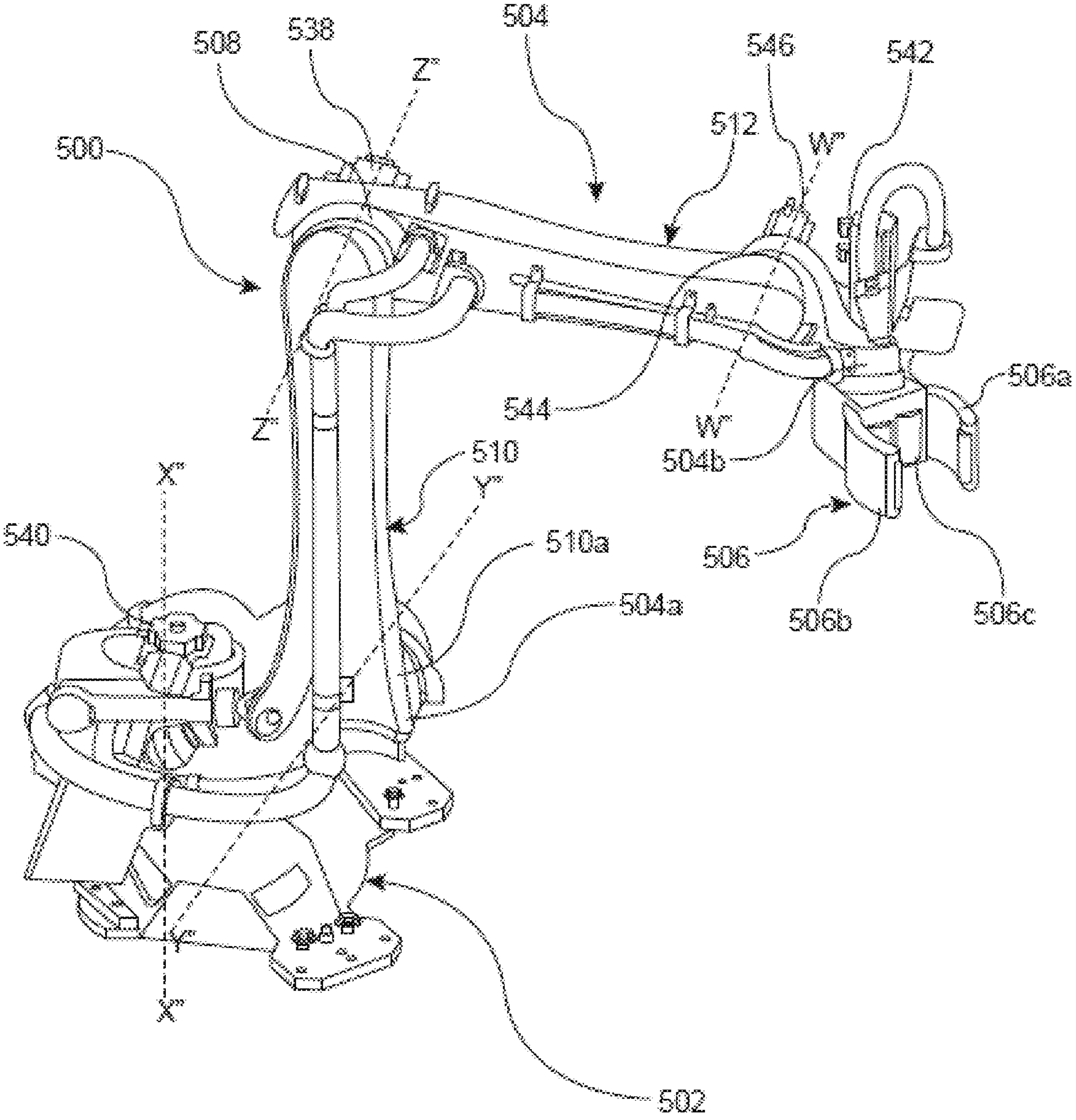
FIG. 16 is an illustration of an embodiment of tube handling apparatus suitable for use in the method according to the third aspect.

Referring to FIG. 16, there is shown a tube handling apparatus 500 having a base 502 and an arm 504, the base 502 being configured to support the arm 504 on a drill floor of a drilling rig. The arm 504 has a first end 504*a* which is mounted on the base 502, a second end 504*b* at which is provided a pick up tool 506 suitable for holding a short tubular (not shown in FIG. 16) and at least one articulated joint 508 by means of which the arm 504, or a portion of the arm 504 may pivot relative to the base 502. The apparatus further comprises an actuator which is operable to pivot the arm 504 about the articulated joint 508 to alter the position of the pick up tool 506 relative to the base 502.

In this embodiment, the arm 504 comprises a first portion 510 and second portion 512 which are joined by a first articulated joint 508. In this example, the articulated joint is configured to allow the second portion 512 to pivot relative to the first portion 510 about an axis Z" which is generally parallel to a surface on which the base 502 is supported (not shown). It will be appreciated that this need not be the case, however, and the articulated joint could equally comprise a pivotal connection between the first end 504*a* of the arm 504 and the base 502.

The first end 504*a* of the arm 504 is pivotally mounted on the base 502. In this example, a first end 510*a* of the first portion 510 is pivotal about an axis X" which is generally perpendicular to a surface on which the base 502 is supported. Moreover, in this embodiment, the joint between the first portion 510 and the base 502 is configured to allow the first portion 510 of the arm 504 to pivot relative to the base 502 about an axis Y" which is generally parallel to a surface on which the base 502 is supported. This need not be the case, however. The first end 510*a* of the first portion 510 of the arm 504 could be fixed to the base 502, or pivotal about only one of these axes X", Y".

A first actuator 538 is operable to pivot the second portion 512 of the arm 504 relative to the first portion 510 of the arm about the articulated joint 508. A second actuator 540 is provided to pivot the first portion 510 of the arm 504 relative to the base 502. In this embodiment, the second actuator 540 is operable to carry out pivoting of the arm 504 about each pivot axes, X", Y" independently of the other, and may comprise two separate actuators.

In this embodiment, the pick up tool 506 comprises a pair of clamping members 506*a*, 506*b* which are pivotally connected to a gripper base 506*c*. A third actuator 542 is provided which is operable to pivot the clamping members 506*a*, 506*b* relative to the gripper base 506*c*, so that the clamping members 506*a*, 506*b* can move towards one another to an operative position to clamp around any part placed between the two clamping members 506*a*, 506*b*, and away from one another into a release position to release the part.

In this case the arm 504 is provided with a second articulated joint 544 in the second arm portion 512 directly adjacent the second end 504*b* of the arm 504. A fourth actuator 546 is provided, and this is operable to pivot the second end 504*b* of the arm 504 about an axis W" which is generally perpendicular to the longitudinal axis of the part of the second arm portion 512 which extends to the first articulated joint 508.

In this embodiment, the actuators 538, 540, 542, 546 are operated hydraulically, and may comprise a hydraulic motor. The source of pressurised hydraulic fluid required for operation of the actuators 538, 540, 542, 546 may be a dedicated hydraulic power pack provided as part of the tube handling apparatus 500. Alternatively, pressurised hydraulic fluid may supplied from a pump located remotely from the apparatus 500 and connected to the apparatus 500 via a hydraulic line.

Figure 17:
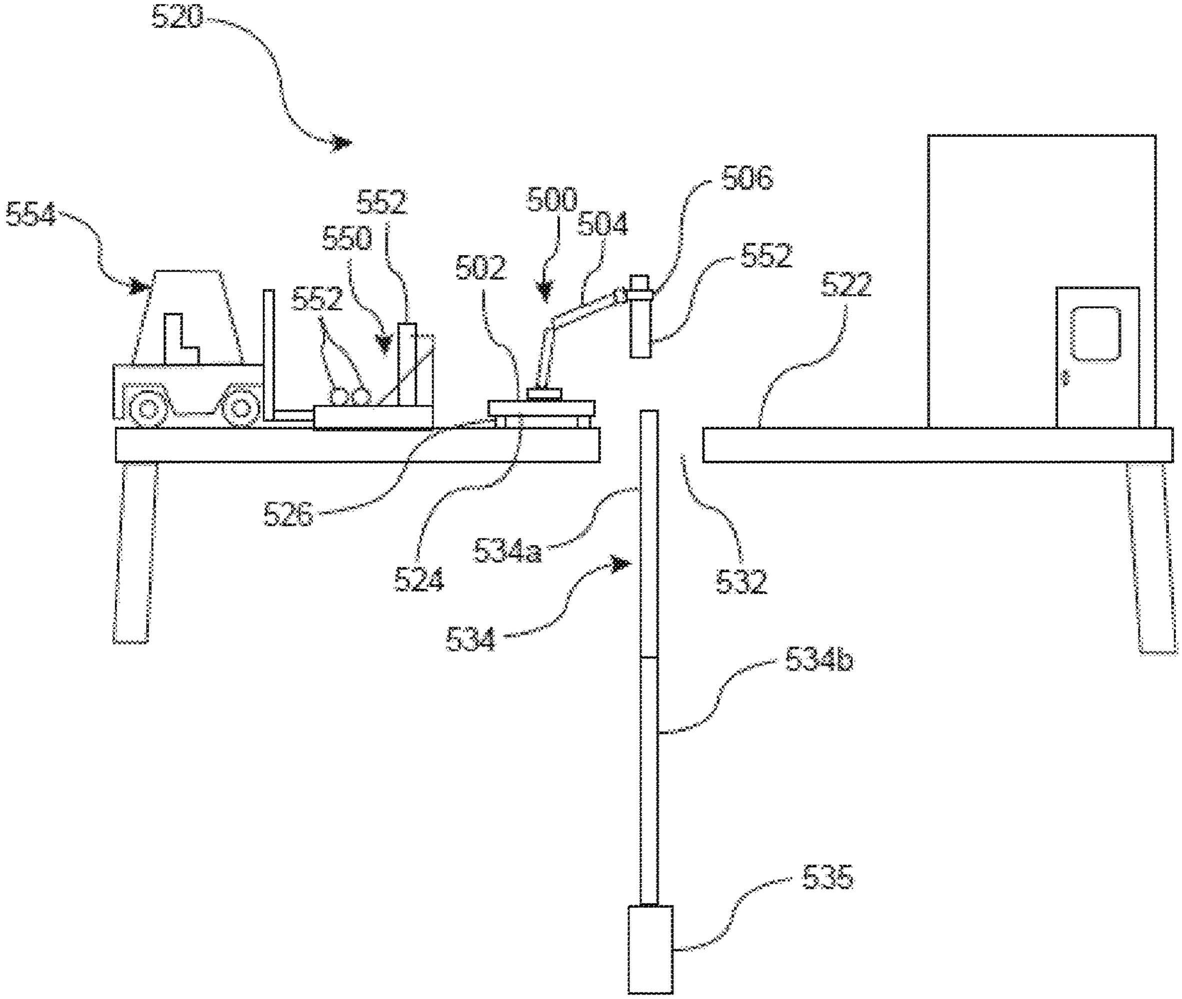
FIG. 17 is a schematic illustration of a drilling rig suitable for in connection with the method according to the third aspect.

Referring now to FIG. 17, there is shown a drilling rig 520 having a drill floor 522 and a tube handling apparatus 500 as described above, on the drill floor 522. In this case, the base 502 of the tube handling apparatus 500 is mounted on a trolley 524 which has wheels 526 which are operable to move the base 502 and arm 504 around the drill floor 522. It will be appreciated that the trolley could equally be provided by tracks, Mecanum or omni wheels, or any other suitable motive means for moving it around the drill floor 522. The base 502 need not be movable relative to the drill floor 522, however, and could be secured to the drill floor 522, either directly or secured to a platform which is secured to the drill floor 522.

Advantageously the wheels 526 are powered by a trolley motor which are operable remotely, for example, from a driller's cabin 528 on the drilling rig 520 adjacent the drill floor 522.

In a preferred embodiment, the actuators 538, 540, 543, 546 provided to operate the tube handling apparatus 500 are also controlled remotely, preferably from the driller's cabin 528.

This remote control may be achieved by a wired or wireless connection to the trolley motor or actuators 538, 540, 542,546.

The drill floor 522 is provided with a derrick (not shown) and an aperture 532 which is below the derrick, through which a drill string 534 extends. The drill string 534 is made up of a plurality of pipe sections 534*a*, 534*b* which are joined end to end. A bottom hole assemble (BHA) 535 is provided at the lowermost end of the lowest pipe section 534*b*.

A short tubular storage apparatus 550 is also located on the drill floor 522 on which a plurality of short tubulars 552 such as subs, are stored. A vehicle 554 is also provided, the vehicle being operable to transport the short tubular storage apparatus 550 around the drill floor 522.

Figure 18:
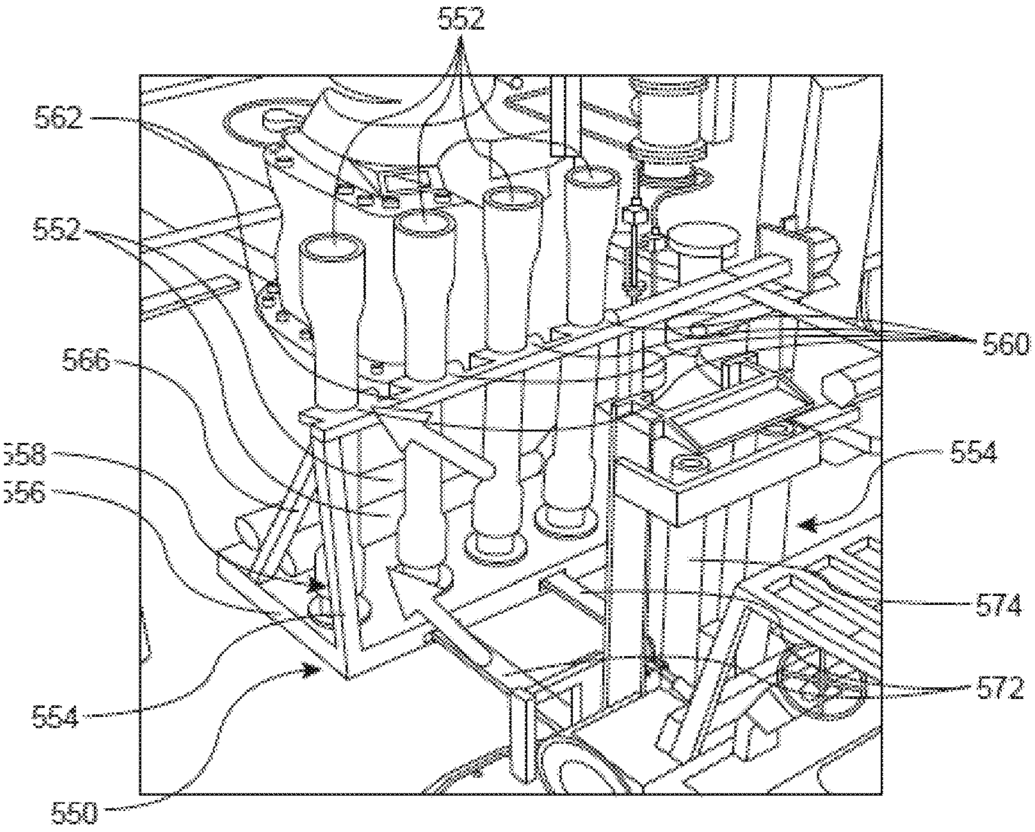
FIG. 18 is an illustration of a vehicle and short tubular storage apparatus suitable for use in the method according to the third aspect.
Figure 19:
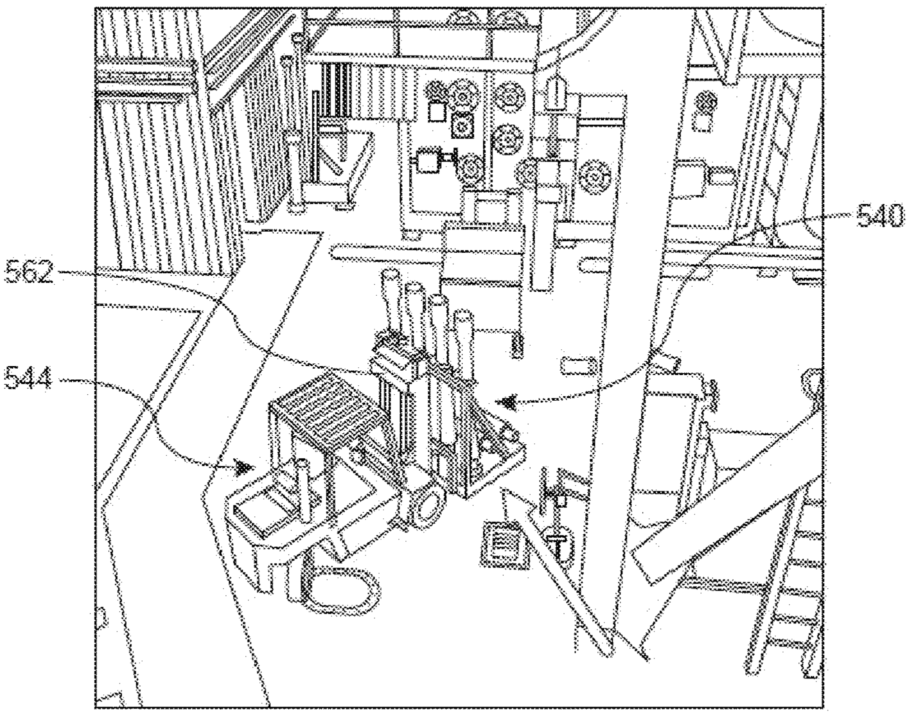
FIG. 19 is an illustration of the vehicle and short tubular storage apparatus illustrated in FIG. 18 on the drill floor of a drilling rig.

The short tubular storage apparatus 550 is illustrated in more detail in FIGS. 18 and 19, and in this embodiment, comprises a platform 556 which is generally rectangular and has a pair of parallel front and rear edges, and pair of parallel sides, and an uppermost surface which is generally parallel to the drill floor 522. A row of tubular support formations is provided on the uppermost surface of the platform 556, in this example adjacent the rear edge thereof. The tubular support formations may comprise a row of rods which extend upwardly from and generally perpendicular to the uppermost surface of the platform 556 so that a sub 552 may be placed over each rod so that the rod extends into the lowermost end of the passage enclosed by the sub 552. Alternatively, it may comprise a row of generally circular apertures or recesses in the uppermost surface of the platform 556 which are sized such that the lowermost end of a sub 552 may be placed into the aperture of recess.

In this example, the short tubular storage apparatus 550 also includes a support frame 558 which extends upwardly from the uppermost surface of the platform 556, and which has a plurality of cradles 560 which are held above the uppermost surface of the platform 556 and which engages with upper or intermediate portions of the subs 552 located on the tubular support formations to provide additional support therefore. The cradles 560 are arranged such that when the platform 556 is on a generally horizontal surface, each cradle is vertically above one of the tubular support formations. The provision of these cradles 560 ensures that the position of the uppermost end of each sub 552 is more precisely positioned relative to the platform 556 than if the subs 552 were merely supported at their lowermost ends.

In this embodiment, the cradles 560 are mounted along an elongate support 562 which is generally parallel to the uppermost surface of the platform 566 and above a rear edge of the platform 566. The elongate support 562 is supported at either end by an upright strut 564 which extends generally perpendicular to the uppermost surface of the platform 556. A diagonal support strut 566 extends diagonally from the each side edge of the platform to an uppermost end of the upright strut 564.

In this embodiment, in addition to holding short tubulars 552 generally perpendicular to the drill floor 522, the short tubular storage apparatus 550 is configured to support short tubulars 552 generally parallel to the drill floor 522. To facilitate this, a plurality of pairs of cradles 570 are mounted on the uppermost surface of the platform 556 adjacent the front edge thereof. The cradles 570 in each pair are parallel to and spaced from one another, so that one of the pair can support a first end of a short tubular 552, and the other one of the pair can support a second end of the short tubular 552.

The vehicle 554 is illustrated in more detail in FIG. 19, and in this example is a fork-lift truck with a pick up mechanism which comprises two prongs or forks 572 and a lifting mechanism 574 which is operable to move the prongs 572 generally perpendicular to the drill floor 522 between a lowermost position on or just above the drill floor 522 and an uppermost position in which the distance of the prongs 572 from the drill floor 522 is increased. One of the edges of the platform 556 of the short tubular storage apparatus 550 (in this example, the rear edge) is provided with apertures into which the prongs 572 may be inserted when in their lowermost position, so that they extend under the uppermost surface of the platform 556 sufficiently to support the full weight of the apparatus and subs 552 when moved to its uppermost position.

It should be appreciated that this is just one example of a vehicle which could be used to transport the short tubular storage apparatus around the drill floor 522.

In this example, the vehicle 554 is driven by a driver on the vehicle, but the vehicle could equally be remotely controlled or autonomously driven by a computer controlled drive system.

Moreover, the vehicle 554 may be integral with the short tubular storage platform 550, for example, by providing the platform 556 with a plurality of wheels and a motor to drive the rotation of the wheels, as described in relation to the trolley on which the tube handling apparatus 500 is mounted.

In this example the drill floor 522 is provided with a marker which marks the desired position of the short tubular storage apparatus 550 on the drill floor 522. This ensures that the short tubular storage platform 550 is always returned to the same position on the drill floor 522.

In one embodiment, the marker comprises one or more cones which are mounted the drill floor 522 in such a way that the apex of each cone is located above the drill floor 522. A corresponding hollow cone or cones is/are provided with the apex of each fixed to the lowermost surface of the platform 556 of the short tubular storage apparatus 550. In this embodiment, the cones are all right circular cones, and are fixed with their axes generally perpendicular to the drill floor 522/lowermost surface of the platform 556 of the short tubular storage apparatus 550. Each cone on the drill floor 522 is sized and shaped to mate with one of the hollow cones on the short tubular storage apparatus 550, i.e. such that it can fit inside one of the hollow cones. The short tubular storage apparatus 550 is in the desired location on the drill floor 522 when it is placed such that the or each cone on the drill floor 522 covers the or each cone on the lowermost surface of the platform 556. Ideally, to ensure that the positioning of the short tubular storage apparatus 550 is correct, two cones are provided spaced from one another as much as possible, for example, one at each of two opposite sides of the platform 556. It will be appreciated, however, that more could be provided—for example, one at each corner of the platform 556.

It should be appreciated, however, that the invention is not restricted to use with a marker of this configuration. Other mechanical markers could be used, for example, the marker on the drill floor 522 may comprise one or more right-angled ridges, one of the corners of the platform 556 fitting into the or each right-angled ridge when the platform 556 is in the correct position. Moreover, electrical or electromagnetic markers could be provided on the drill floor 522, which interact with a sensor on the platform 556 (or vice versa), there being a processor which detects if the marker is correctly aligned with the sensor, and emits an audible or visual signal when the platform 556 is correctly positioned.

A sub 552 may be added to the drill string by 534 by operating the lifting mechanism 574 of the vehicle 554 so that the prongs 572 are in the lowermost position, moving the vehicle 554 so that the prongs 572 slot into the rear edge of the platform 556 of the short tubular storage apparatus 550, operating the lift mechanism 574 so that the short tubular storage apparatus 550 is lifted off the drill floor 522, moving the vehicle 554 so that the short tubular storage apparatus 550 is above the desired position on the drill floor 522, and then operating the lifting mechanism 574 to lower the short tubular storage apparatus 550 into the desired position on the drill floor 522.

The tube handling apparatus 500 can then be used to remove a sub 552 from the short tubular storage apparatus 550 and attach it to the top of the drill string 535.

The third actuator 542 is operated to move the clamp members 506*a*, 506*b* of the pick up tool 506 to their release position, and one or more of the first, 538, second 540 or fourth 546 actuators of the tubular handing apparatus 500 to move the arm 504 so that its second end 504*b* moves towards the sub 552 until the two clamping members 506*a*, 506*b* surround the uppermost end of the sub 552. The third actuator 542 is then operated to bring the two clamp members 506*a*, 506*b* together so that they clamp around the uppermost end of the sub 552. One or more of the first 538, second 540 or fourth 546 actuators may then be operated to lift the sub 552 from the short tubular storage apparatus into position on top of the drill string 534, where it can be connected to the uppermost section of drill string 534*a* using conventional means, for example, using an iron roughneck.

Where the tube handling apparatus 500 is mounted on a trolley 524, rather than secured to the drill floor 522, the trolley motor may also be operated to achieve the desired movement of the sub 552 to the drill string 534 by movement of the tube handling apparatus 500 relative to the drill floor 522 in addition to movement of the arm 504 itself.

This process can be reversed in order to disconnect a sub 552 from the drill string 534.

As mentioned above, the actuators 538, 540, 542, 546 and trolley motor (where used) may be set up to be controlled remotely by an operator in the driller's cabin 528. Thus, the connection or disconnection of the sub 552 to the drill string 534 can be achieved without the involvement of personnel in the red zone. It is also possible for the actuators and trolley motor (where provided) to be connected to an electronic control system with a processor programmed to provide for automatic control of arm 504, pick-up tool 506 and trolley. In this case, the accurate positioning of the sub 552 on the drill floor 522 is particularly important to ensure that the automatic movement of the arm 504 brings the pick up tool 506 to the sub 552 in such a way that when the clamping member 506*a*, 506*b* to the operative position causes them to clamp around the sub 552. This is achieved by the use of the markers described above to ensure that the short tubular storage apparatus 550 is moved to a pre-set position on the drill floor 522, and the provision of the cradles 560 to support the upper end of the sub 552 whilst on the short tubular storage apparatus 550.

In a fourth aspect, there is provided an apparatus for and method of setting slips around a drill string, particularly but not exclusively, on a drilling rig.

When making or breaking the connection between pipe sections, it is known to suspend the drill string from the drill floor using slips which comprise three or more steel wedges that are hinged together and form a near circle around the drill string, with the thicker end of each wedge above the thinner end. The radially inwardly facing surface of each wedge can be provided with a roughened gripping surface, which may comprise replaceable steel teeth, to provide increased friction between the slips and the outer surface of the drill string.

The slips are positioned around the drill string just above the well centre opening—an aperture in the drill floor through which the drill string extends, and then set by lowering the drill string so that the slips engage with the drill floor. The taper of the wedges is matched to the taper of the edges of the well centre opening and so the taper generates from the downward force from the drill string a radially inward compressive force which pushes the slips against the drill string. The drill string is thus gripped by the slips, and the engagement of the slips with the drill floor acts to prevent any further downward movement of the drill string relative to the drill floor. The drill string is thus supported by the drill floor.

The slips are removed by raising the drill string to release the grip of the slips on the drill string, and the slips lifted off from around the drill string.

Typically, personnel working in the red zone are involved in manual setting of the slips. They can be assisted using equipment such as a pneumatically or hydraulically powered arm which is pivotally mounted on a base secured around the well centre opening. The slips are mounted on the free end of the arm, and the arm pivoted about an axis which is generally parallel to the drill floor, to lower and position the slips around the drill string. Manual intervention is required to bring the slips to the well centre and to mount the slips on arm, however.

Figure 20:
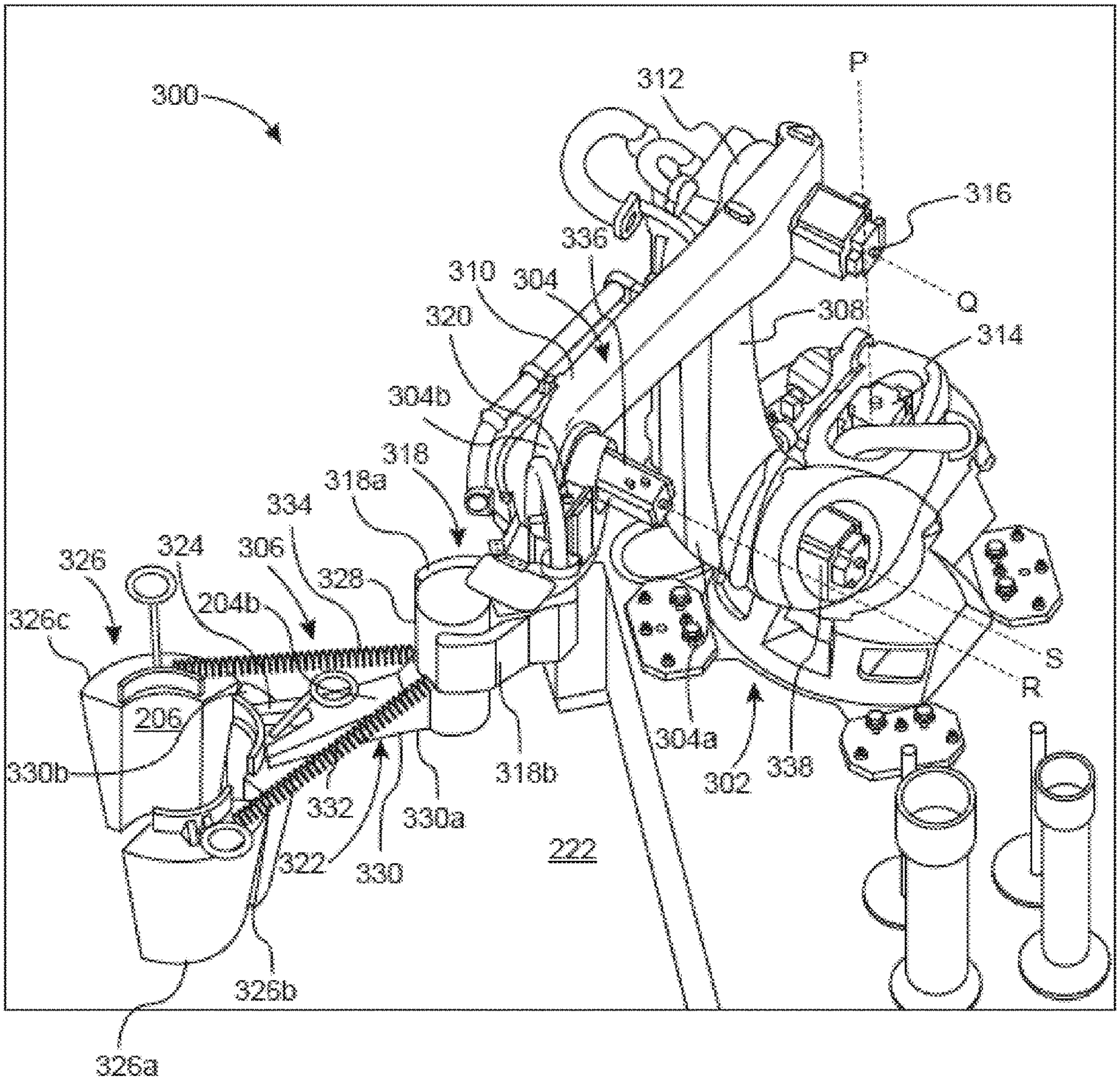
FIG. 20 shows an illustration of a slip lifting apparatus and assembly with slips mounted on the slip lifting tool.

Referring now to FIG. 20, there is shown a slip lifting apparatus 300 for setting slips around a drill string comprising a base 302 and an arm 304, the base 302 being configured to support the arm 304 on a drill floor of a drilling rig, the arm 304 having a first end 304*a* which is mounted on the base for pivoting about a first axis P, a second end 304*b* at which is provided with a slip lifting tool 306. The arm 304 comprises a first portion 308 and a second portion 310 which are connected by a joint 312 by means of which the second portion 310 may rotate with respect to the first portion 308 about a second axis Q which is generally perpendicular to the first axis P, the first portion 308 extending from the first end 304*a* of the arm 304 to the joint 312, and the second portion 310 extending from the joint 312 to the second end 304*b* of the arm 304. When the base 302 is supporting the arm 304 on a drill floor, the first axis P is generally perpendicular to the drill floor, whilst the second axis Q is generally parallel to the drill floor.

The apparatus 300 further comprises a first actuator 314 which is operable to pivot the arm 304 relative to the base 302 about the first axis P, and a second actuator 316 which is operable to pivot the second portion 310 of the arm 304 relative to the first portion 308 of the arm 304 about the second axis Q.

In this embodiment, the slip lifting tool 306 comprises a gripper 318 having first and second clamp parts 318*a*, 318*b* and a gripper actuator 320 which is operable to move the first and second clamp parts 318*a*, 318*b* towards one another to a grip position (illustrated in FIG. 20), and away from one another to a release position. The slip lifting tool 306 further comprises a separate slip holder 322 which has a connector 324 by means of which the slip holder 322 can be mounted on slips 326, and a grip part 328 which is shaped to be gripped by the gripper 318 by placing the first and second clamp parts 318*a*, 318*b* around the grip part 328 and using the gripper actuator 320 to move the clamp parts 318*a*, 318*b* to the grip position, as illustrated in FIG. 20.

As described above, slips 326 generally comprise three or more steel wedges that are hinged together and form a near circle around the drill string. In this example, the slips 326 comprise just three wedges 326*a*, 326*b*, 326 each of which has two longitudinal edges. One longitudinal edge of the central wedge 326*b* is connected to one of the longitudinal edges of the first outside wedge 326*a* by means of one or more hinges, and the other longitudinal edge of the central wedge 326*b* is connected to one of the longitudinal edges of the second outside wedge 326*c* by means of one or more hinges. The wedges 326*a*, 326*b*, 326*c* are curved so that when the outside wedges 326*a*, 326*c* are pivoted about the hinges towards one another to a closed position, the outside longitudinal edges of the outside wedges 326*a*, 326*b* come into engagement or come very close to one another and the three wedges form an annulus or a near complete annulus. The outside wedges 326*a*, 326*c* can be pivoted about the hinges to an open position in which the outside longitudinal edges of the outside wedges 326*a*, 326*c* are separated, as illustrated in FIG. 20.

In use, as described above, the slips are mounted around a drill string with the thicker end of each wedge above the thinner end. As such, the slip lifting tool 306 is configured to hold the slips 326 in this orientation. In this embodiment, the connector 324 comprises an elongate support beam 330 which has a longitudinal axis, a first end 330*a* to which the grip part 328 is connected, and a second end 330*b* provided with two prongs which extend generally downwardly perpendicular to the longitudinal axis of the support beam 330. The thicker end of the central wedge 326*b* of the slips is provided with two apertures, with the prongs of the connector 324 inserted into these apertures.

The slip holder 306 also, in this embodiment, comprises two springs 332, 334 a first end of each of which is connected to the slip holder 306 and a second end of which is connected to one of the outside wedges 326*a*, 326*c* of the slips 326. The springs 332, 334 are stretched when the slips 326 is in its closed configuration, and therefore act on the outside wedges 326*a*, 326*c* to pivot about their hinges and pivot away from one another.

In this example, the slip lifting tool 306 is pivotally mounted on the second end 304*b* of the arm 304 for rotation with respect to the arm 304 about a third axis R which is generally perpendicular to the longitudinal axis of the second portion 310 of the arm 304. The apparatus 300 further comprises a third actuator 336 which is operable to pivot the slip lifting tool 306 relative to the arm 304 about the third axis R.

The slip lifting tool 306 may also be pivotally mounted on the second end 304*b* of the arm for rotation with respect to the arm about a fourth axis which is generally perpendicular to the longitudinal axis of the second portion 310 of the arm 304 and to the third axis R. In this case, advantageously, the apparatus 300 further comprises a fourth actuator which is operable to pivot the slip lifting tool 306 relative to the arm 304 about the fourth axis.

In this example, the connection between the base 302 and the first portion 308 of the arm 304 is configured such that the arm 304 can pivot about a fifth axis S which is parallel to the second axis Q, in addition to the first axis P. A further actuator 338, which is operable to pivot the second portion 308 of the arm 304 relative to the base 302 is also provided.

The or each actuator 314, 316, 320, 336, 338 may, for example, be hydraulically, electrically or pneumatically driven.

Figure 21:
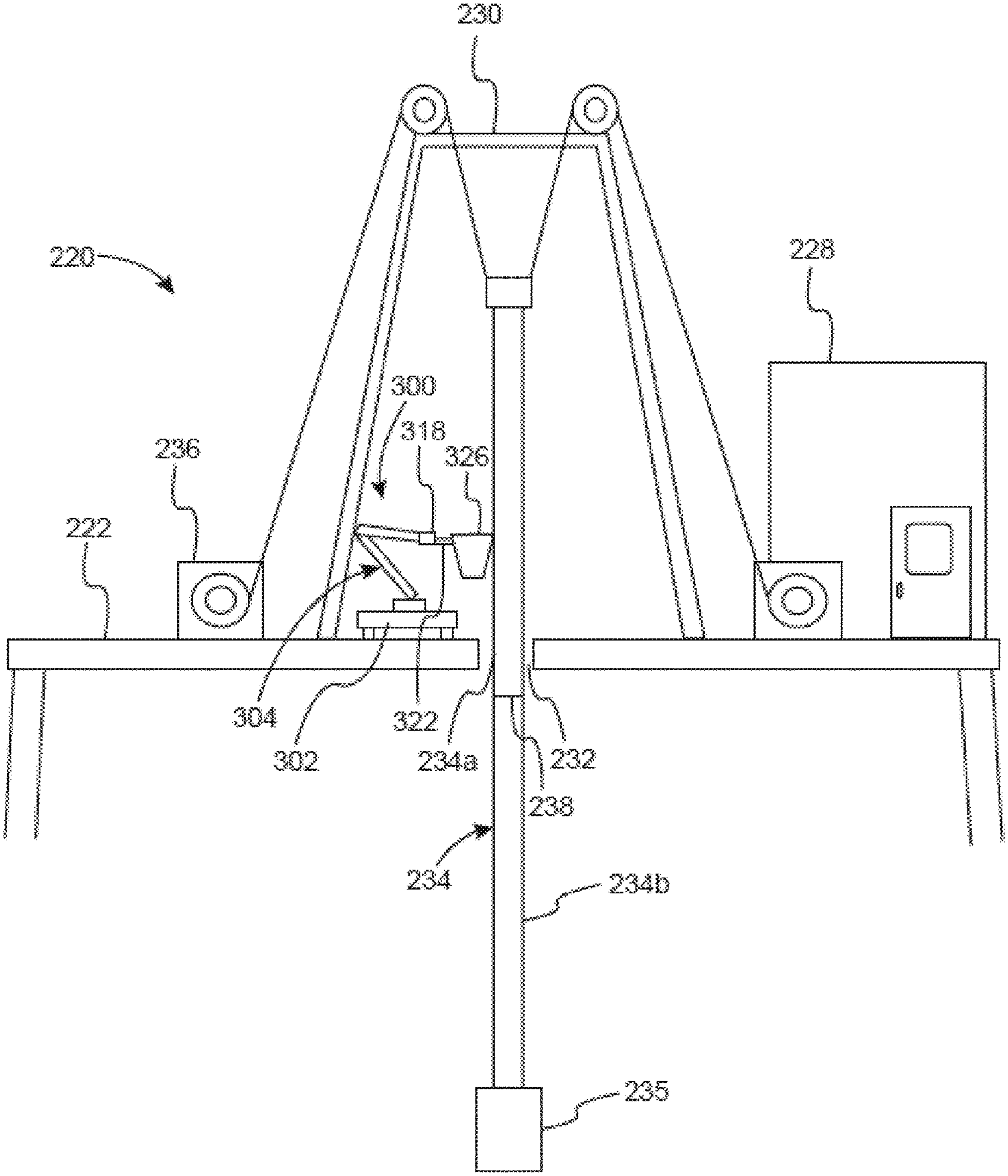
FIG. 21 shows a schematic illustration of a drilling rig having a slip lifting apparatus and assembly arranged on a drill floor.

The slip lifting apparatus 300 may be mounted on a drilling rig 220, as illustrated in FIG. 21. The drilling rig 220 has a drill floor 222 with a well centre aperture 232 and the base 302 of the slip lifting apparatus 300 is on the drill floor at a location close to but spaced from the well centre aperture 232. The base 302 of the apparatus 300 may be fixed in relation to the rig floor 222 (e.g. on the rig floor 222 itself or on a structure adjacent the rig floor 222), or it may be mounted on a trolley which is movable around the rig floor 222 (described in further detail below). A drill string 234 is suspended from a derrick 230 and extends through the well centre aperture 232 into a well bore (not shown).

The slip lifting apparatus may be used as follows.

With the slip lifting tool 306 mounted on the second end 304*b* of the arm 304 of the slip lifting apparatus 300, all or some of the actuators 314, 316, 320, 336, 338 are operated to move the arm 304 and slip lifting tool 306 in such a way as to insert the prongs of the slip holder 322 into the apertures in the central wedge 326*b* of the slips 326. One or more of the actuators 314, 316, 320, 336, 338 are then operated to lift the slips 326 and to move the slips 326 towards the drill string 234, and to mount the slips 326 around the drill string 234.

In order to ensure that the prongs of the slip lifting tool 306 do not simply slide out of the apertures in the slips 326, the slip lifting tool 306 is advantageously tilted before the slips 326 are lifted off the drill floor 222. This can be achieved by the operation of actuator 336 to pivot the slip lifting tool 306 relative to the second portion 310 of the arm 304 about the third axis R. It could also be achieved by operating actuator 316 to pivot the second portion 310 of the arm 304 relative to the first portion 308 about the second axis Q, or actuator 338 to pivot the first portion 308 of the arm 304 about the fifth axis S. Alternatively, a combination of two or more of these actuators could be used, to ensure that the slips 326 still rest on the drill floor 222 until the required degree of tilt is achieved.

Preferably the actuator or actuators 336, 316, 338 are operated so as to tilt the slips 326 backwards, so that radially inward facing surface of the central wedge 326*b* faces upwards, and the radially outward facing surface of the central wedge 326*b* is turned towards the drill floor 222. This can be achieved by moving the thicker (upper) end of the central wedge 236*b* towards the base 302 of the slip lifting apparatus 300.

In addition to ensuring that the slips 326 stay on the slip lifting tool 306, tilting the slips 326 in this direction assists the springs 332, 334 in maintaining the slips 326 in its open position, since gravity causes the outside wedges 326*a*, 326*c* to pivot about their hinges away from one another. It is even possible to omit the springs 332, 334 and to rely on gravity and the tilting of the slips 326 to open the slips 326.

One or more of the actuators 314, 316, 336, 338, is/are then operated to lift the slips 326 off the drill floor 222. Preferably, this is achieved by operating actuator 316 to pivot the second portion 310 of the arm 304 about the second axis Q so that the second end 304*b* of the arm 304 rises. Actuator 338 can also be operated to pivot the first portion 308 of the arm 304 about the fifth axis S so that the first portion 308 moves towards a vertical orientation.

Once the slips 326 have been lifted off the drill floor 222, actuator 314 can be operated to pivot the arm 304 relative to the base 302 about the first axis P to move the slips 326 towards the drill string 234, with the actuator 338 being operated, if necessary, to bring the lowermost end of the central wedge 326*b* into engagement with the drill string 234.

One or more of the actuators 336, 316, 338 is/are then operated to tilt the slips 326 towards a generally vertical position in which the central wedge 326*b* engages with the drill string 234 along substantially its entire length. If the slips 326 are not provided with springs, this may be sufficient to cause the outer wedges 326*a*, 326*c* to pivot to the closed position. However, where springs are provided, as in the illustrated embodiments, the springs may retain the slips 326 in its open position. In this case, it may be necessary for the drill string 234 to extend through a generally conical bushing, the uppermost end of the bushing having a greater internal diameter than the lower end. The internal diameter of the upper end of the bushing is set so that the lower end of the slips 326 can be inserted into the upper end of the bushing whilst the slips 326 is in the open position, and the internal diameter of the lower end of the bushing is set that when the slips 326 are in the closed position, the lowermost end of the slips 326 can fit into and it supported by the bushing. One or more of the second, third or fourth actuators 316, 336, 338 are then operated to lower the slips 326 down the drill string 234 until the drill string 234 is supported by the drill floor 222. Where a conical bushing is provided, an internal surface of the bushing engages with the outer surfaces of the wedges 326*a*, 326*b*, 326*c* and, by virtue of the conical nature of the bushing, the outer wedges 326*a*, 326*c* are pushed together into the closed position as the slips 326 move down the drill string 234.

Once the drill string 324 is supported by the drill floor 222, the gripper actuator 320 to move the clamp parts 318*a*, 318*b* to the release position, and then operating the arm actuators 314, 316, 336, 338 to move the arm 204 away from the drill string 234.

When the slips 326 are to be removed, this process is reversed. One or more of the arm actuators 314, 316, 336 and 338 are operated to move the clamp parts 318*a*, 318*b* of the gripper 318 around the grip part 328 of the slip holder 322, the operating the gripper actuator 320 to move the clamps parts 318*a*, 318*b* to the closed position, in which they are gripping the slip holder 322.

One or more of the arm actuators 316, 336, 338 are then operated to lift the slips 326 upwards relative to the drill string 324, out of the conical bushing, if provided. Where springs are provided the removal of the slips 326 from the bushing releases the slips and allows the springs to return the outer wedges to the open position. One or more of the arm actuators 314, 316, 336, 338 may then be operated to move the slips 326 away from the drill string 234, and return the slips 326 to the storage location. If no springs are provided, it may first be necessary to operate one or more of the arm actuators 314, 316, 336, 338 to tilt the slips 326 so that the radially inward facing surface of the central wedge 326*b* faces upwards, and the radially outward facing surface of the central wedge 326*b* is turned towards the drill floor 222, so that gravity acting on the outer wedges 326*a*, 326*c* causes them to fall open.

It will be appreciated, that the apparatus may be used in conjunction with a further robot arm which is used to assist in opening and closing the slips 326.

The apparatus 300 may also be part of a tool assembly for handling slips 326 on the drill floor 222. The tool assembly may comprise the arm 304 having a plurality of articulated parts 308,310 and rotatably mounted on the base 302 which is fixed in relation to the drill floor 222, a slips lifting tool 306, a holder 318 or holder means 318 for the slips lifting tool 306, where the holder 318 or holder means 318 is arranged on the arm 304 and operable to hold the slips lifting tool 306. The slips lifting tool 306 may comprise a connector 324 operable to engage and carry the slips 326.

The holder 318 or holder means 318 may be operable to releasably engage and hold the slips lifting tool 306. For example, the holder 318 or holder means 318 may comprise a gripper 318*a,b* operable to grip and hold a grip part 328 of the slips lifting tool 306. Alternatively, other types of connection mechanisms may be used, such as a prong engaging a corresponding receiver (the prong arranged on the holder 318 or the slips lifting tool 306), a click-on type connector, or the like.

Illustrated in FIG. 21, in any of the embodiments herein, the apparatus 300 or individual functions, such as the arm 304, may be controlled from a remote location. This may, for example, be a driller's cabin 228 arranged on or adjacent the drill floor 222. Optionally, the remote control may be done from another operator station.

The slip lifting tool 306 may comprise a slips carrier 322 having a first connector 324 fixed to the slips 326 and a second connector 328 operable to engage the holder 318. The second connector 328 can be a grip part 328 operable to be gripped or clamped by the holder 318 or holder means 318. The first connector may be, for example, prongs arranged in corresponding receiver parts in the slips 326, or alternatively a different type of connection, such as a bolted connection, clamps, or the like.

Figure 22:
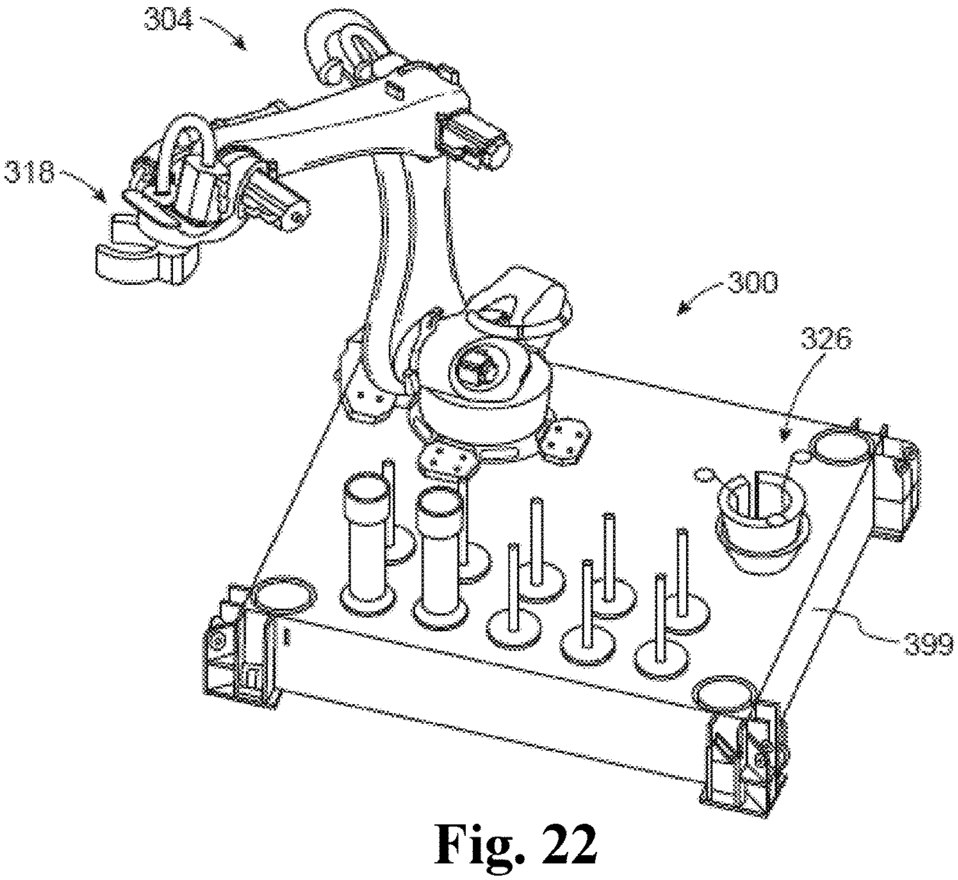
FIGS. 22 and 23 illustrate an embodiment of a slip lifting apparatus and assembly arranged on a movable trolley.
Figure 23:
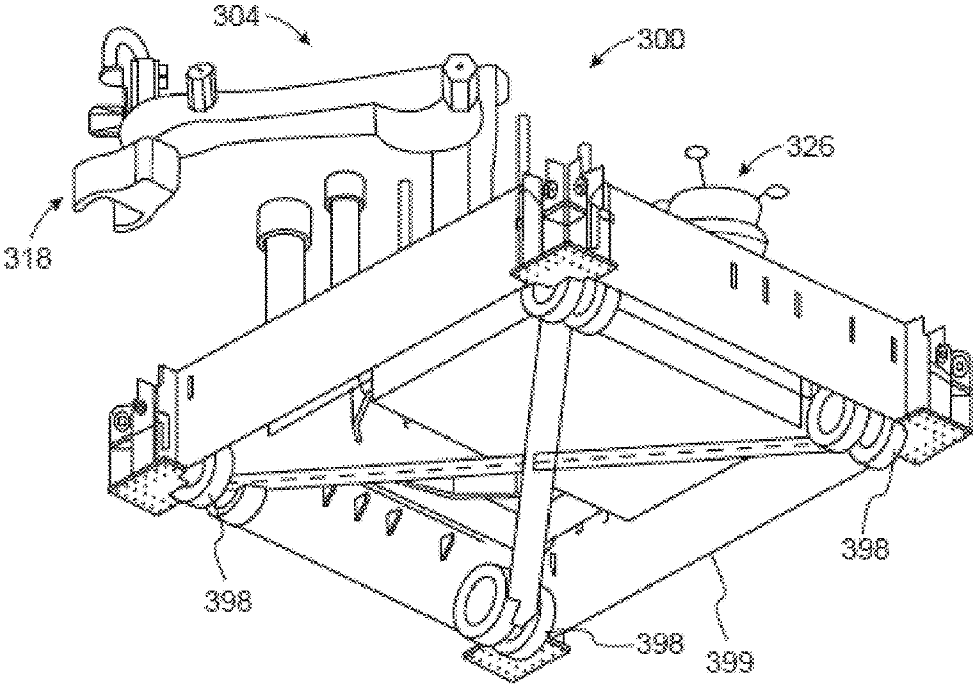

Illustrated in FIGS. 22 and 23, in any of the embodiments herein, the apparatus 300 or tool assembly may be arranged on a movable trolley 399. The movable trolley 399 may be arranged with drive units or drive means 398 operable to drive the trolley 399 on or around the drill floor 222. As shown in FIG. 23, in this embodiment the trolley 399 is illustrated with wheels 398 on an underside of the trolley 398 and operable to move the trolley 398 on an underlying surface, such as the drill floor 222 or a deck adjacent the drill floor 222. Alternatively, the drive units or drive means 398 can, for example, be wheels engaging rails or tracks on the drill floor 222.

By providing the apparatus 300 or tool assembly on a movable trolley 399, they can be moved away from the well centre 232 when required, for example when carrying out operations in which the slip lifting tool 306 is not required.

In a fifth aspect, this disclosure relates to an apparatus for and method of moving a suspended object around drill floor of a drilling rig during drilling a well bore or during or oil and/or gas production.

Sometimes a short tubular or sub, is secured to the top of the drill string. The subs are generally stored on a pallet with a plurality of vertical rods extending upwardly from its uppermost surface, each subs being placed with one end over one of the rods so that the sub is supported in a vertical or near vertical orientation. In order to lift one of the subs, it is attached to cable, which extends from the sub over the Derrick, and down to a winch located on the drill floor. The winch may then be operated to reel in the cable, and lift the sub off the drill floor. Operators on the drill floor push or pull the cable above the sub to manoeuvre the sub in a generally horizontal plane so that it is vertically above the uppermost end of the drill string, before the winch is operated to lower the sub onto the top of the drill string. A winch and cable may also be used to lift other heavy items off the drill floor, with operators manually moving the item in a generally horizontal direction around the drill floor to the desired location.

Figure 24:
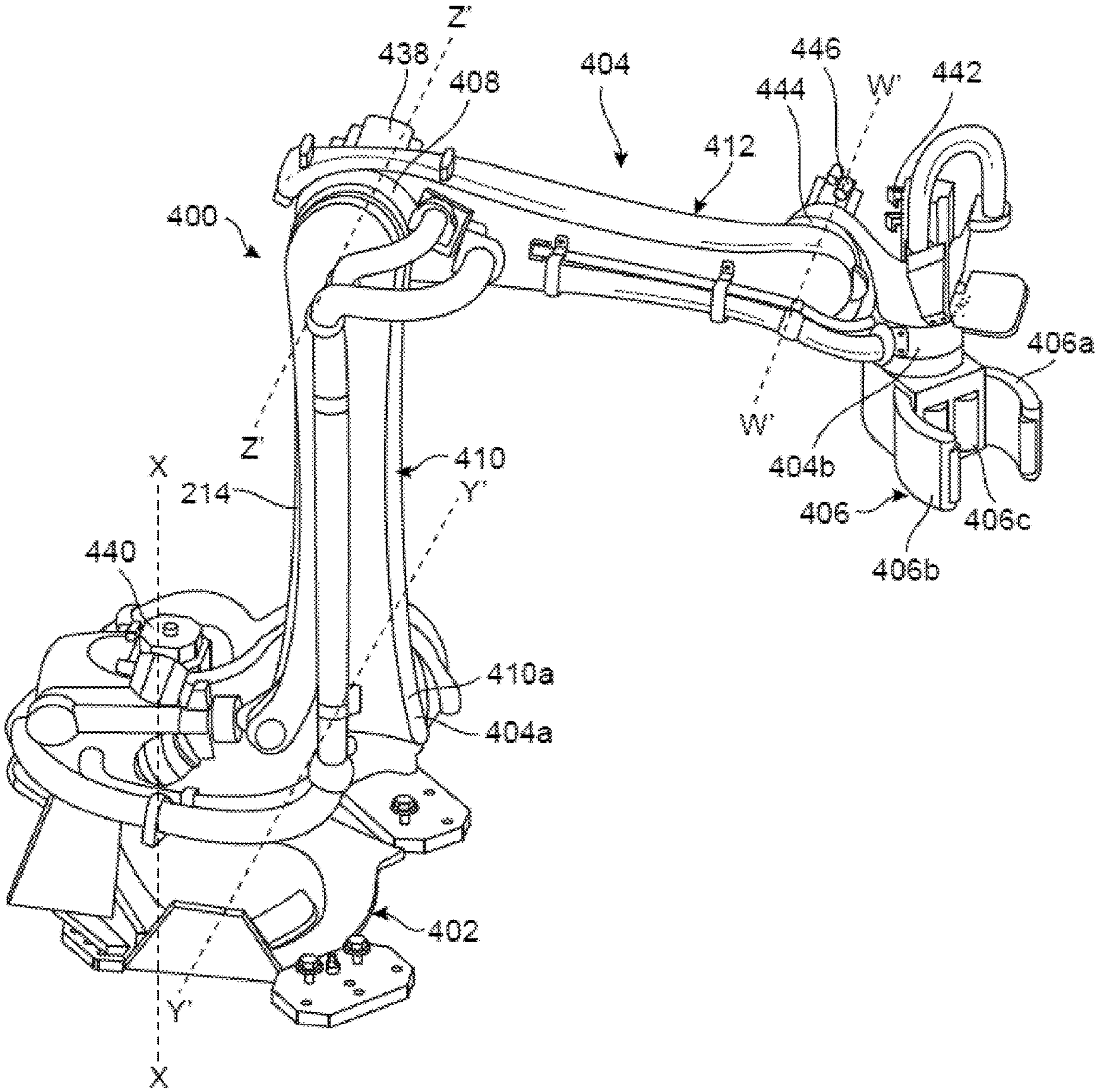
FIG. 24 is an illustration of a base and arm of a guiding apparatus according to the fifth aspect of the invention.

Referring to FIG. 24, there is shown a guide apparatus 400 for guiding the movement of a load suspended from a cable or wire, the apparatus 400 having a base 402 and an arm 404, the base 402 being configured to support the arm 404 on a drill floor of a drilling rig. The arm 404 has a first end 404*a* which is mounted on the base 402, a second end 404*b* at which is provided a gripper 406 suitable for holding a wire guide (not shown in FIG. 24) and at least one articulated joint 408 by means of which the arm 404, or a portion of the arm 404 may pivot relative to the base 402. The apparatus further comprises an actuator which is operable to pivot the arm 404 about the articulated joint 408 to alter the position of the gripper 406 relative to the base 402.

In this embodiment, the arm 404 comprises a first portion 410 and second portion 412 which are joined by a first articulated joint 408. In this example, the articulated joint is configured to allow the second portion 412 to pivot relative to the first portion 410 about an axis Z' which is generally parallel to a surface on which the base 402 is supported (not shown). It will be appreciated that this need not be the case, however, and the articulated joint could equally comprise a pivotal connection between the first end 404*a* of the arm 404 and the base 402.

The first end 404*a* of the arm 404 is pivotally mounted on the base 402. In this example, the first end of the first portion 410 is pivotal an axis X' which is generally perpendicular to a surface on which the base 402 is supported. Moreover, in this embodiment, the joint between the first portion 410 and the base 402 is configured to allow the first portion 410 of the arm 404 to pivot relative to the base 402 about an axis Y' which is generally parallel to a surface on which the base 402 is supported. This need not be the case, however. The first end 410*a* of the first portion 410 of the arm 404 could be fixed to the base 402, or pivotal about only one of these axes X', Y'.

A first actuator 438 is operable to pivot the second portion 412 of the arm relative to the first portion 410 of the arm about the articulated joint 408. A second actuator 440 is provided to pivot the first portion 410 of the arm 404 relative to the base 402. In this embodiment, the second actuator 440 is operable to carry out pivoting of the arm 402 about each pivot axes, X', Y' independently of the other, and may comprise two separate actuators.

The gripper 406 comprises a pair of clamping members 406*a*, 406*b* which are pivotally connected to a gripper base 406*c*. A third actuator 442 is provided which is operable to pivot the clamping members relative to the gripper base 406*c*, so that the clamping members 406*a*, 406*b* can move towards one another to clamp around any part placed between the two clamping members 406*a*, 406*b*, and away from one another to release the part.

In this case the arm 404 is provided with a second articulated joint 444 in the second arm portion 412 directly adjacent the second end 404*b* of the arm 404. A fourth actuator 446 is provided, and this is operable to pivot the second end 404*b* of the arm 404 about an axis W' which is generally perpendicular to the longitudinal axis of the part of the second arm portion 412 which extends to the first articulated joint 408.

In this embodiment, the actuators 438, 440, 442, 446 are operated hydraulically, and may comprise a hydraulic motor. The source of pressurised hydraulic fluid required for operation of the actuators 438, 440, 442, 446 may be a dedicated hydraulic power pack provided as part of the guiding apparatus 400. Alternatively, pressurised hydraulic fluid may supplied from a pump located remotely from the apparatus and connected to the apparatus via a hydraulic line.

Figure 25A:
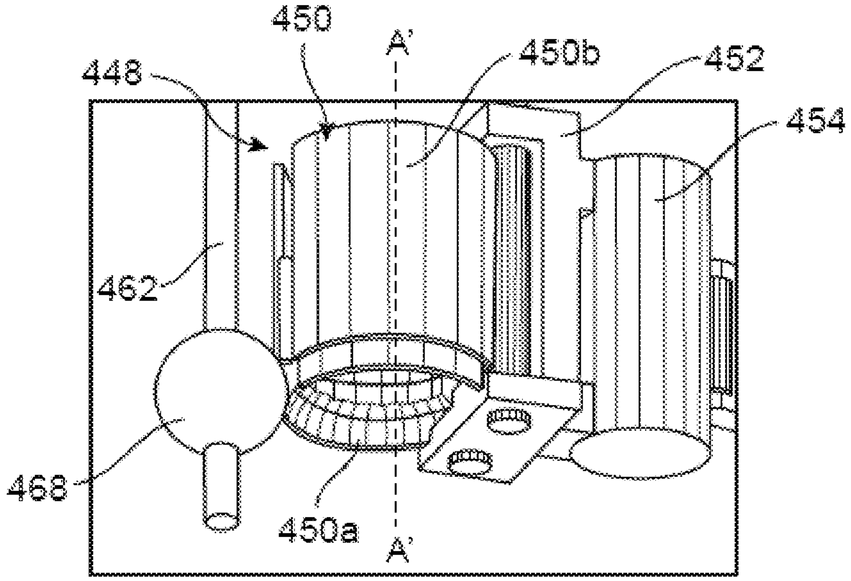
FIGS. 25*a* and 25*b* are illustrations of an embodiment of wire guide suitable for use in the apparatus illustrated in FIG. 24, with a) the wire guide in an engage/release position, and b) the wire guide in an operative position.
Figure 25B:
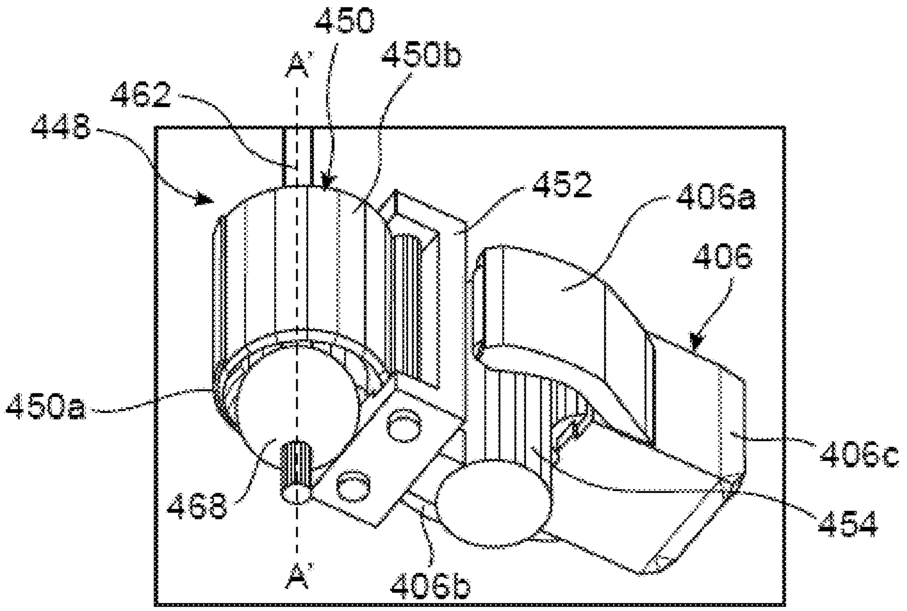

Referring now to FIGS. 25*a* and 25*b*, there is shown an embodiment of wire guide 448 which may be used in conjunction with the apparatus 400 illustrated in FIG. 25. The wire guide 448 comprises a hook 450, which has a wire axis A' and which is mounted on a base part 452, the hook 450 being configured to enclose or at least partially enclose the wire axis A'.

In this embodiment, the hook 450 comprises two separate hook parts 450*a*, 450*b* which are both pivotally connected to the base part 452. The wire guide 448 is provided with a release actuator (not shown) which is operable to pivot both of the hook parts 450*a*, 450*b* relative to the base part 425 between an open position in which the free ends of the hook parts 450*a*, 450*b* are spaced from one another so that a wire or cable can be moved between them to the wire axis, and a closed position in which the hook parts completely enclose the wire axis. The hook parts 450*a*, 450*b* in the embodiment are curved and, when in the closed position, together with the base part 452, enclose a generally cylindrical space, with the wire axis A' extending along the longitudinal axis of the cylindrical space.

It will be appreciated that, whilst in this embodiment, both hook parts 450*a*, 450*b* are pivoted by the release actuator, this is not necessarily the case. The hook 450 may be moved between its open and closed positions by the pivoting of only one of the hook parts 450*a*, 450*b*.

The wire guide 448 also comprises a grip part 454, which in this embodiment is generally cylindrical and is generally parallel to the cylindrical space enclosed by the hook parts 450*a*, 450*b*. The wire guide 448 may therefore by mounted on the second end 404*b* of the arm 404 of the apparatus illustrated in FIG. 24, by placing the grip part 454 of the wire guide 448 between the two clamping members 406*a*, 406*b* of the gripper 406, and operating the third actuator 442 to pivot the clamping members 406*a*, 406*b* so that they clamp onto and hold the grip part 454 of the wire guide 448, as illustrated in FIG. 25*b*.

An alternative embodiment of wire guide 448' is illustrated in FIGS. 26 and 27*a*, 27*b* and 27*c*. In this embodiments, the hook 450' comprises two hook parts 450*a*', 450*b*' which are not pivotal relative to the base part 452'. Instead, the two hook parts 450*a*', 450*b*' are spaced from one another in a direction generally parallel to the wire axis A'.

In this particular embodiment, the hook 450 comprises a tube or rod which is curved to form part of a helix (in this example just over one turn of a helix), which spirals around wire axis A'. It will be appreciated, however, that the tube/rod need not be exactly helical, and may simply be curved around the wire axis A' so that when viewed parallel to the wire axis A', the wire axis A' is surrounded completely, or almost completely, by the hook 450.

The base part 452' is mounted on a holder 454' which is mounted on the end of the second portion 412 of the arm 404. The holder 454' could comprise a grip part like that shown in the embodiment illustrated in FIGS. 25*a* and 25*b*, and the gripper 406 used to mount the wire guide 448' on the arm 404 as described above. In this embodiment, however, the holder 454' is secured directly to the second end 404*b* of the arm 404.

The hook 450' is fixed to the base part 452', and therefore no release actuator is required. Instead an actuator 456 is provided which is operable to pivot the wire guide 448' about a pivot axis V' which is generally perpendicular to the wire axis A' and to the longitudinal axis of the second portion 412 of the arm 404.

The wire guide comprises a release mechanism which protects the arm 404 from being overloaded or damaged by excess force being applied to it by the wire guide. In this embodiment, the base part 452' and holder 454' are mechanically coupled together in such a way that the two can be parted if sufficient force is exerted on the hook 450' pulling it away from the arm 404. In this embodiment, the holder 454' comprises an outer frame 454*a*' which is secured to the second end 404*b*' of the arm 404, and the base part 452' an inner frame.

Figure 26:
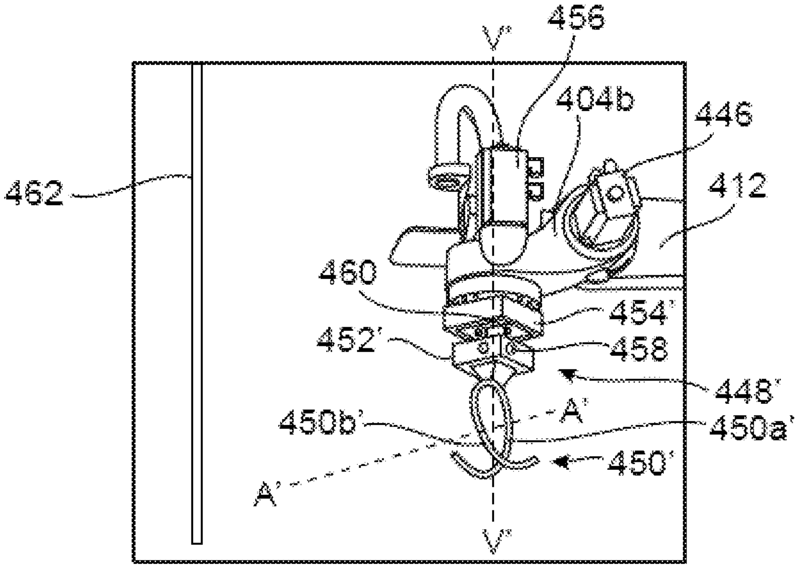
FIG. 26 is an illustration of the wire guide illustrated in FIGS. 27*a*, 27*b* and 27*c* with the release mechanism activated.

In this embodiment, the inner frame 452' is retained in the outer frame 454' by means of a detent mechanism in the form of plurality of generally hemispherical protuberances 458 which extend from radially outward facing surfaces of the inner frame 452' and are lodged in correspondingly shaped recesses 460 in the radially inwardly facing surface of the outer frame 454'. The lodging of the protuberances 458 in the recesses 460 holds the base part 452' in the holder 454' together if a relatively low force is applied to the hook 450', but if a sufficiently high force is applied to the hook 450' to pull it away from the arm 404, the protuberances will become dislodged, and the hook 450' become separated from the arm 404, as illustrated in FIG. 26.

Alternative configurations of release mechanism are possible, however. For example, the protuberances may be provided on the outer frame 454' and lodge in corresponding recesses in the inner frame 452'. Moreover, instead of protuberences, spring loaded elements may extend from the inner frame 452' into corresponding recesses in the outer frame 454' (or vice versa). Alternatively, the wire guide 448' may be secured to the holder 454' by means of shear pin bolts which fracture to release the wire guide 448' from the holder 454' when the applied force exceeds a predetermined level.

Figure 28:
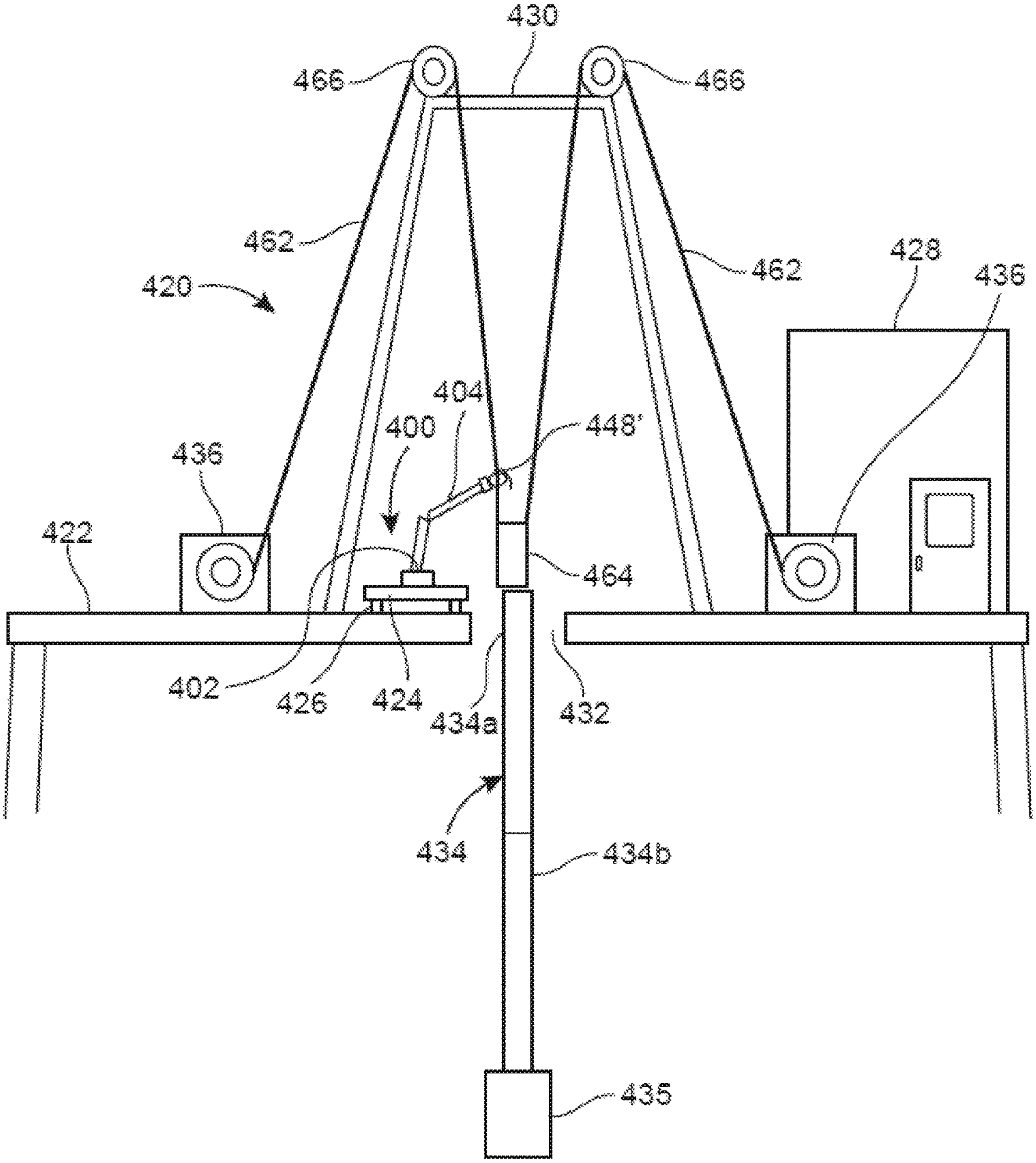
FIG. 28 is a schematic illustration of a drilling rig according to the fifth aspect.

Referring now to FIG. 28, there is shown a drilling rig 420 having a drill floor 422 and a guiding apparatus 400 as described above, on the drill floor 422. In this case, the base 402 is mounted on a trolley 424 which has wheels 426 which are operable to move the base 402 and arm 404 around the drill floor 422. It will be appreciated that the trolley could equally be provided by tracks, Mecanum or omni wheels, or any other suitable motive means for moving it around the drill floor. The base need not be movable relative to the drill floor 422, and could, however, be secured to the drill floor 422, either directly or secured to a platform which is secured to the drill floor 422.

Advantageously the wheels 426 are powered by a trolley motor which operable remotely, for example, from a driller's cabin 428 adjacent the drill floor 422.

In a preferred embodiment, the actuators 438, 440, 443, 446, 456 provided to operate the guiding apparatus 400 are also controlled remotely, preferably from the driller's cabin 428.

This remote control may be achieved by a wired or wireless connection to the trolley motor or actuators 438, 440, 442,446, 456.

The drill floor 422 is provided with a derrick 430 and an aperture 432 which is below the derrick 430, through which a drill string 434 extends. The drill string 434 is made up of a plurality of pipe sections 434*a*, 434*b* which are joined end to end. A bottom hole assemble (BHA) 435 is provided at the lowermost end of the lowest pipe section 434*b*.

The drilling rig 420 is further provided with two winches 436 by means of which heavy items of equipment may be suspended from the derrick 430. A cable 462 extends from each of the winches 236. Each cable has a first end which is connected to its respective winch, and a free end which can be connected to an object to be lifted from and suspended above the drill floor 422, In the illustration shown in FIG. 28, the free end of each cable 462 is secured to an end of a short section of drill string or a sub 464. An intermediate portion of each cable 462 extends over and is supported by a fixed pulley 466 mounted on the derrick 430.

Figure 27A:
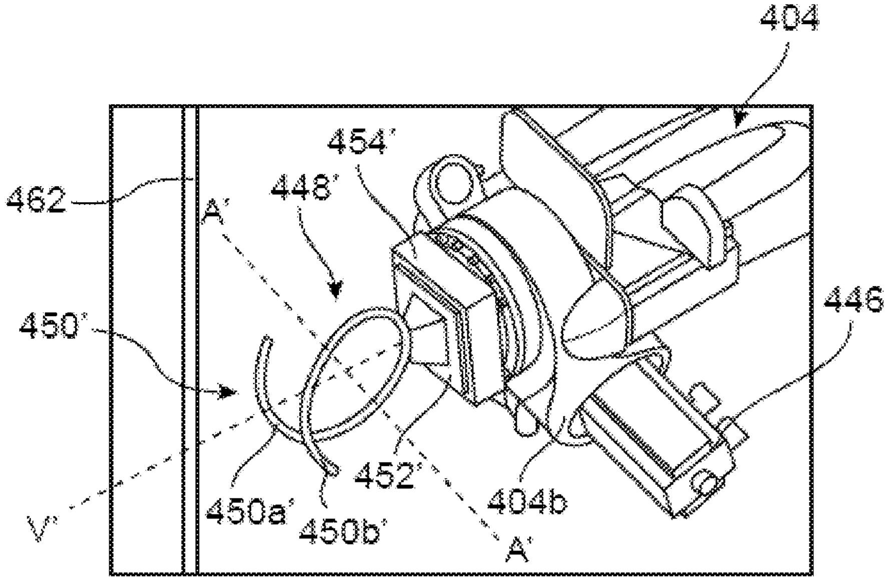
FIGS. 27*a*, 27*b* and 27*c* are illustrations of an alternative embodiment of wire guide suitable for use in the apparatus illustrated in FIG. 24, with a) the wire guide in an engage/release position, and b) the wire guide in the engage/release position being brought into engagement with a wire, and c) the wire guide in an operative position.
Figure 27B:
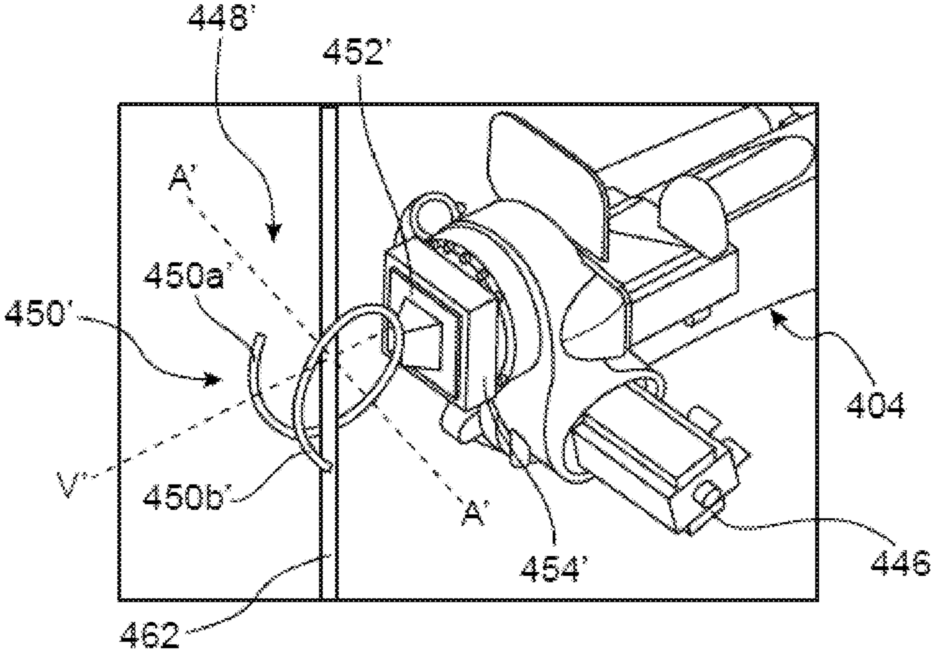
Figure 27C:
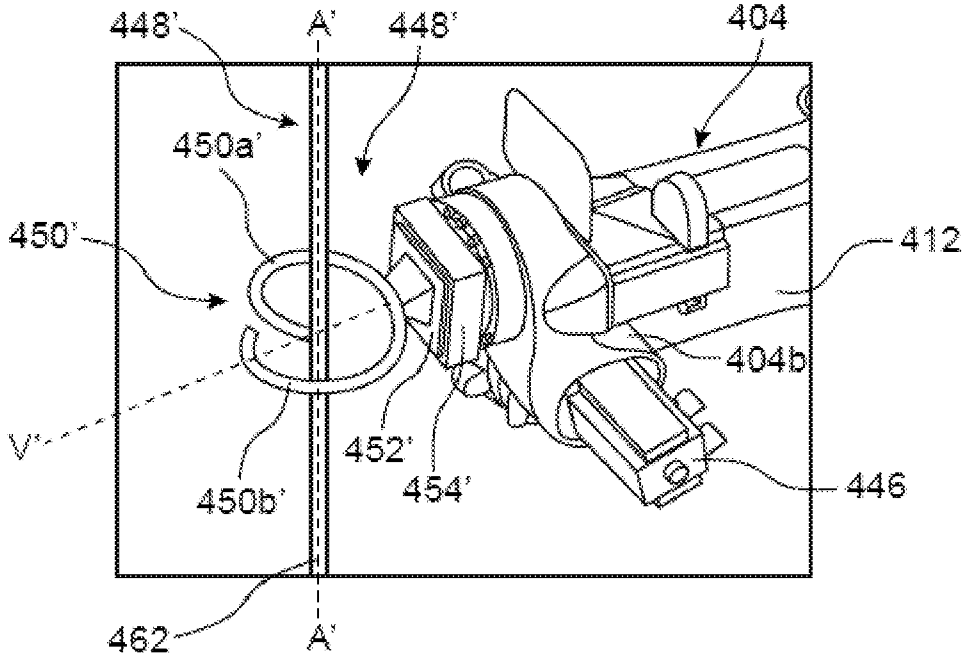

The guiding apparatus 400 can be used to assist in manoeuvring the sub 464 in a generally horizontal direction whilst it is suspended from the cables 462 over the drill floor 422. The hook 450, 450' of the wire guide 448, 448' is placed around one of the cables 462 and one or more of the first, second and fourth actuators 438, 440, 446 are operated so that the cable 462 is pushed or pulled by the guiding apparatus 400 in such a way as to move the sub 464 to the desired position. Where the guiding apparatus 400 is mounted on a trolley 424, rather than secured to the drill floor 422, the trolley motor may also be operated to achieve the desired movement of the sub 464 by movement of the guiding apparatus 400 relative to the drill floor 422 in addition to movement of the arm 404 itself.

Where the wire guide 448 is as illustrated in FIGS. 25*a* and 25*b*, the hook 450 is placed around the cable 462 by operating the release actuator to pivot one or both of the hook parts 450*a*, 450*b* to the open position as illustrated in FIG. 25*a*. One or more of the first, second or fourth actuators 438, 440, 446 are then operated to move the hook 450 towards the cable 462 until the cable passes through the gap between the ends of the two hook parts 450*a*, 450*b* into the space enclosed by the two hook parts 450*a*, 450*b*. The release actuator is then operated to pivot one or both of the hook parts 450*a*, 450*b* to the closed position as illustrated in FIG. 25*b* so that a portion of the cable is encircled or surrounded by the hook 450.

Where the wire guide 448' is as illustrated in FIGS. 26, 27*a*, 27*b*, and 27*c*, the hook 450' is placed around the cable 462 by operating the actuator 456 to pivot the wire guide 450' about pivot axis V' until the wire axis A' is generally perpendicular to the cable 462 as illustrated in FIG. 27*a*. One or more of the first, second or fourth actuators 438, 440, 446 are then operated to move the hook 450' towards the cable 462 until the cable passes through the gap between the two hook parts 450*a*', 450*b*' into the space enclosed by the two hook parts 450*a*', 450*b*' as illustrated in FIG. 27*b*. The actuator 456 is then operated to pivot the wire guide 450' about the pivot axis V' until the wire axis A' is generally parallel to the cable 462 as illustrated in FIG. 27*c*. A portion of the cable 462 is thus encircled or surrounded by the hook 450'.

It will be appreciated that the object suspended from the cable 462 can be very heavy, and, as such, significant forces can be exerted on the arm 404 whilst pulling on the cable 462 to move the object. As such, a release mechanism is provided to disengage the cable 462 from the arm 404 should these forces reach such high levels that they could cause damage to the arm 404.

In the case of the embodiment of wire guide illustrated in FIGS. 25*a* and 25*b*, a release part, in this example in the form of a ball 468, is mounted on the cable 462. The wire guide 448 is placed around the cable 462 such that the release ball 468 is below the hook 450. The lowermost ends of the hook parts 450*a*, 450*b* are chamfered and sized such the release ball 468 cannot pass along the cylindrical space enclosed by the hook parts 450*a*, 450*b* when they are in the closed position. If the cable 462 moves upwardly relative to the hook 450, the release ball 468 engages with the chamfered portion of the hook parts 450*a*, 450*b*, and if the force exerted on the hook 450 by the cable 462 is sufficiently large, this causes the hook parts 450*a*, 450*b* to pivot to their open position and free the release ball 468.

In relation to the embodiment of wire guide 448' illustrated in FIGS. 26, 27*a*, 27*b*, and 27*c*, if the cable 462 is pulling on the arm 404 with a sufficiently high force, the base part 452' of the wire guide 450' will detach from the holder 454' as described in relation to FIG. 26 above, and the excess force of the arm 404 will be removed in that way. It should be appreciated, however, that the embodiment of wire guide 448 illustrated in FIGS. 25*a* and 25*b* could also be mounted on the arm 404 via a holder from which it is detachable in the same way.

In the embodiment illustrated in FIG. 28, the drilling rig 420 is provided with one guiding apparatus 400. It will be appreciated that more than one guiding apparatus 400 may be provided, with each guiding apparatus pulling or pushing on the same or a different cable 462. For example, in the embodiment illustrated in FIG. 28, two guiding apparatus 400 may be provided on the drill floor 422, with the wire guide of one guiding apparatus pushing or pulling on one of the two cables 462, and the wire guide of the other guiding apparatus pushing or pulling on the other one of the two cables 462. Alternatively, the element to be moved (in this case a sub 464) may be suspended from a single cable 462 and guided by a single guiding apparatus 400.

In a sixth aspect, this disclosure relates to a machine for supporting a drilling operation on a drill floor of a drilling rig during drilling a well bore or during or oil and/or gas production.

According to the sixth aspect, a machine 1,200,300,400,500,600 for a drilling plant may be positioned or configured to be positioned on a drill floor 21,222,422,522,622 adjacent a well centre opening 232,432,532,632. The machine 1,200,300,400,500,600 may have a general design similar to one of one of the machines 1,200,300,400,500 described in relation the embodiments outlined above. (See, for example, FIGS. 12, 16, 20 and 24.)

The machine has a base 2,202,302,402,502,602 and an arm 3,204,304,404,504,604. A tool engagement member 318,406,506 is operable to releasably engage one of at least two different tools 4,206,240,250,306,448,448'.

In accordance with the sixth aspect, a multipurpose machine is thus provided for carrying out different operations at or near the well centre opening 232,432,532 is provided.

The tool 4,206,240,250,306,448,448' can be a tool configured for manipulating an object positioned in the well centre opening 232,432,532, which is configured for positioning in the well centre opening, which is being prepared for positioning in the well centre opening, or which has been pulled out of the well centre opening.

Advantageously, the at least two different tools comprises at least two of:

a thread cap removal tool 4
a cleaning tool 206,240,250
a slips lifting tool 306, or
a wire guide tool 448,448'.

The different tools can be provided with a part configured to cooperate with the engagement member such as to releasably hold a given tool in or by the engagement member and thereby holding the tool by the arm. This may, for example, be a releasable connector between the tool and the engagement member. Each of the mentioned tools mentioned above and described in relation to the preceding embodiments above can be provided with such a connector such as to make the tool releasably connectable to the arm. Any supplies required by the tool, such as cleaning fluid or hydraulic power, can be provided with appropriate hoses or lines connected to the tool, as required.

The machine may comprise a base and an arm, the base being configured to support the arm on the drill floor, for example such as those described above in relation to e.g. FIG. 12, 16, 20 or 24.

The arm may have a first end which is mounted on the base for pivoting about a first axis which and a second end which is provided with the tool engagement member.

The arm may comprise a first portion and a second portion which are connected by a joint by means of which the second portion may rotate with respect to the first portion about a second axis which is generally perpendicular to the first axis, the first portion extending from the first end of the arm to the joint, and the second portion extending from the joint to the second end of the arm.

The machine may comprise a first actuator which is operable to pivot the arm relative to the base about the first axis.

The machine may comprise a second actuator which is operable to pivot the second portion of the arm relative to the first portion of the arm about the second axis.

The tool engagement member may comprise a gripper having first and second clamp parts and a gripper actuator which is operable to move the first and second clamp parts towards one another to a grip position, and away from one another to a release position. The tool engagement member may, for example, be a tool engagement member such as described in relation to FIG. 20 above.

The at least two different tools may each have a grip part which is shaped to be gripped by the gripper by placing the first and second clamp parts around the grip part and using the actuator to move the clamp parts to the grip position. The grip parts may, for example, be grip parts such as that described in relation to FIG. 20 above.

The tool engagement member may be pivotally mounted on the second end of the arm for rotation with respect to the arm about a third axis which is generally perpendicular to the longitudinal axis of the second portion of the arm.

The tool engagement member may be pivotally mounted on the second end of the arm for rotation with respect to the arm about a fourth axis which is generally perpendicular to the longitudinal axis of the second portion of the arm and to the third axis.

The machine may comprise a third actuator which is operable to pivot the tool engagement member about the third axis.

The machine may comprise a fourth actuator which is operable to pivot the tool engagement member relative to the arm about the fourth axis.

The base may comprise wheels or tracks which, when the base is resting on a drill floor of a drilling rig, are operable to move the base and arm around the drill floor.

The machine may further be provided with a controller which is operable to control the operation of the machine, and which is remote from the remainder of the machine.

Figure 29:
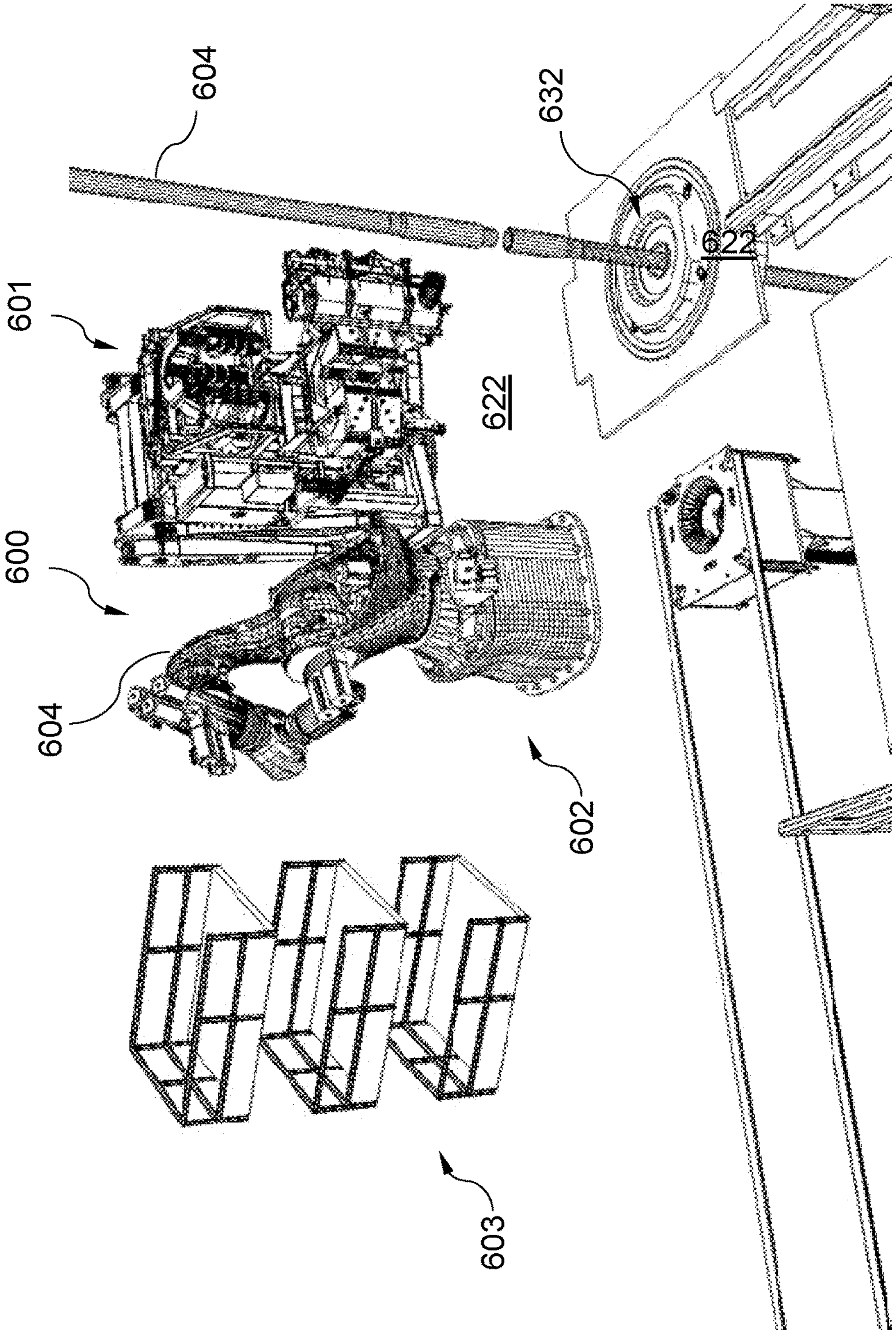
FIG. 29 illustrates parts of a drilling rig according to an embodiment of a sixth aspect.

Illustrated in FIG. 29, a drilling plant may comprise a machine 600 and a storage rack 603, the storage rack 603 arranged such as to be reachable by the machine for lay-down or retrieval of at least one of the tools.

Advantageously, the machine 600 is positioned between the storage rack 603 and the well centre opening 632.

The storage rack 603 may comprise a plurality of shelves distributed vertically.

The drilling plant typically further comprises other machines, such as a roughneck 601, operating on or adjacent the drill floor 622 to manipulate items such as a pipe string 604 extending into the well centre opening 632.

Advantageously, the need for operators to be present in the red zone at the drill floor 622, i.e. near or around the well centre opening 632, may be reduced. For example, any provision of tools or operations required on such tools may be carried out while the tools are in the storage rack 603, which may be spaced from the immediate vicinity of the well centre opening 632. By providing a machine as disclosed here, various tools can be picked up from the storage rack 603 and utilised in the well centre area of the drill floor 622.

According to the sixth aspect, more efficient and/or safe operations can, for example, therefore be achieved in the area near the well centre opening.

The invention is not limited by the embodiments described above; reference should be had to the appended claims.

What is claimed is:

1. A drilling plant comprising:

a drill floor having a well center opening;

a roughneck machine;

a multipurpose machine, the multipurpose machine comprising:

a base, an arm comprising a first end and a second end, and a tool engagement member which is configured to releasably engage one of at least two different tools, each of the at least two different tools being configured to perform an operation on a drill string component or a drill floor component; and a storage rack which is arranged so as to be reachable by the multipurpose machine for a laying-down of or a retrieval of at least one of the at least two different tools, wherein, the multipurpose machine is arranged on the drill floor adjacent to the well center opening, and the first end of the arm is mounted on the base and the second end of the arm is provided with the tool engagement member, the tool engagement member being pivotally mounted on the second end of the arm for a rotation with respect to the arm about at least one axis.

2. The drilling plant as recited in claim 1, wherein the at least two different tools comprises at least two of a thread cap removal tool, a cleaning tool, a slips lifting tool, and/or a wire guide tool.

3. The drilling plant as recited in claim 1, wherein, the tool engagement member comprises, a gripper comprising a first clamp part and a second clamp part, and a gripper actuator which is configured to move the first clamp part and the second clamp part towards one another to a grip position, and away from one another to a release position, and the at least two different tools each comprise a grip part which is shaped to be gripped by the gripper via placing the first clamp part and the second clamp part around the grip part, and using the actuator to move the first clamp part and the second clamp part to the grip position.

4. The drilling plant as recited in claim 1, wherein the base comprises wheels or tracks which are operable to move the base and the arm relative to the drill floor.

5. The drilling plant as recited in claim 1, wherein, the arm comprises, a first portion, a second portion, and a joint which connects the first portion and the second portion so that the second portion is rotatable with respect to the first portion, wherein, the first portion extends from the first end to the joint, and the second portion extends from the joint to the second end, and the tool engagement member is pivotally mounted on the second end of the arm so as to rotate with respect to the second portion about a first axis and a second axis, the first axis and the second axis being perpendicular in with respect to each other so that the tool engagement member has two rotational degrees of freedom relative to the second portion.

6. The drilling plant as recited in claim 5, wherein one of the first axis and the second axis is parallel to a longitudinal axis of the second portion.

7. The drilling plant as recited in claim 5, wherein the storage rack comprises a plurality of shelves which are distributed vertically.

8. The drilling plant as recited in claim 1, wherein the multipurpose machine further comprises one or more supply lines which is/are configured to deliver at least one of a cleaning fluid or a hydraulic power to a tool of the at least two different tools which is engaged by the tool engagement member.

9. The drilling plant as recited in claim 1, wherein, the multipurpose machine further comprises a controller which is configured to control an operation of the multipurpose machine, and the controller is arranged farther from the well center opening than is a remainder of the multipurpose machine.

10. The drilling plant as recited in claim 1, wherein, the multipurpose machine is arranged between the storage rack and the well center opening.

* * * * *